(12) United States Patent
Watanabe et al.

(10) Patent No.: US 6,568,769 B1
(45) Date of Patent: May 27, 2003

(54) ELASTIC FLAT TREAD

(75) Inventors: Hiroaki Watanabe, Komatsu (JP); Kazutoshi Hori, Komatsu (JP); Teiji Yamamoto, Katano (JP); Tomihiro Tagawa, Hirakata (JP); Kenji Taira, Katano (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/486,900

(22) PCT Filed: May 28, 1998

(86) PCT No.: PCT/JP98/02339

§ 371 (c)(1),
(2), (4) Date: Mar. 3, 2000

(87) PCT Pub. No.: WO99/12799

PCT Pub. Date: Mar. 18, 1999

(30) Foreign Application Priority Data

Sep. 5, 1997 (JP) .............................................. 9-256181

(51) Int. Cl.$^7$ ................................................ B62D 55/24
(52) U.S. Cl. ...................... 305/171; 305/165; 305/167
(58) Field of Search ................................. 305/171, 177, 305/165, 167, 170, 173, 174, 175

(56) References Cited

U.S. PATENT DOCUMENTS 5,145,242 A * 9/1992 Togashi
5,368,376 A * 11/1994 Edwards et al.
5,984,437 A * 11/1999 Katoh
6,106,083 A * 8/2000 Ono
6,170,925 B1 * 1/2001 Ono

FOREIGN PATENT DOCUMENTS

| JP | 50-100734 | 8/1975 |
| JP | 52-12934 | 1/1977 |
| JP | 62-43985 | 3/1987 |
| JP | 1-162880 | 11/1989 |
| JP | 2-96382 | 8/1990 |
| JP | 22-25186 | 9/1990 |
| JP | 32-20071 | 9/1991 |
| JP | 4-56593 | 5/1992 |
| JP | 5-58358 | 3/1993 |
| JP | 53-05883 | 11/1993 |
| JP | 72-91157 | 11/1995 |
| JP | 8-48269 | 2/1996 |

* cited by examiner

Primary Examiner—Russell D. Stormer
(74) Attorney, Agent, or Firm—Armstrong, Westerman & Hattori, LLP

(57) ABSTRACT

The present invention is an elastic flat tread which can prevent an elastic solid from cracking even if the vehicle runs on a protruding object during traveling. For this purpose, the elastic flat tread is provided with any core (1, 11, 115) of a core (1, 11) attached to a link (6) and a core (115) attached to a metal plate (9A) which is attached to a link (8), and end portions (1a, 1b; 11a, 11h; 115a, 115b) in a longitudinal direction of the aforesaid any core (1, 11, 115) are bent toward the side not in contact with the ground.

12 Claims, 27 Drawing Sheets

GROUND-CONTACTING SIDE

GROUND-CONTACTING SIDE

ELASTIC FLAT TREAD

TECHNICAL FIELD

The present invention relates to an elastic flat tread for an endless crawler belt, which is used for a hydraulic shovel, bulldozer, and other construction equipment, and particularly, to an elastic flat tread with improvements in the shapes and the materials of a core and an elastic solid covering the core.

BACKGROUND ART

Conventional construction equipment such as hydraulic shovels and bulldozers with steel crawler belts being attached has the disadvantage of damaging asphalt road surfaces when traveling on a public road on the move between work sites, and therefore increasing number of vehicles are equipped with rubber crawler belts recently.

The rubber crawler belts are formed by a number of core wires and cores embedded in rubber in an endless shape, but if problems such as a crack and peeling, of rubber occurs, it is difficult to repair them, which necessitates the replacement of the crawler belt to a new one, thereby causing the disadvantage of increasing user cost.

In order to overcome the foregoing disadvantage, elastic flat treads formed by iron crawler plates with elastic solids such as rubber being bonded thereto are used. Recently, an art is developed, in which a core is embedded into an elastic solid to construct an elastic flat tread, a plurality of which are disposed in a longitudinal direction of a crawler to thereby form an endless crawler belt.

As a prior art of an elastic flat tread, for example, Japanese Patent Application Laid-open No. 7-152305 is known, which will be explained with reference to FIG. 53 and FIG. 54. In an elastic flat tread 140, a planar core 120 is covered with an elastic solid 130 from the entire ground-contacting side toward core end portions 121 and 121 in a longitudinal direction of the core 120 on the side not in contact with the ground, and bonded thereto by vulcanization. The core 120 is fastened to a link 150 by bolts not illustrated. Numeral 132 is a bolt hole for insertion of the bolt.

However, in the above elastic flat tread 140, as shown in FIG. 55, elastic solid end portions 131 are locally bent to thereby cause the concentration of stress, when the elastic flat tread 140 runs on a protruding object such as a rock or stone A and a curb stone of a sidewalk not illustrated. As a result, the disadvantage of a crack P occurring in the elastic solid end portion 131 is caused. This is because the core 120 is designed to have high rigidity so as not to be deformed even if the vehicle weight W of construction equipment is exerted on the elastic flat tread 140 via a lower roller 145 and a link 150.

Meanwhile, even the elastic solid 130 with higher rigidity in nature has lower rigidity than that of the core 120. Consequently, when running on a protruding object such as a rock or stone A and a curb stone of a side walk, so long as the protruding object does not escape therefrom, distortion concentrates on the elastic solid 130 due to the difference in rigidity between the core 120 and the elastic solid 130, thereby causing the crack P in the elastic solid end portion 131 shown in FIG. 55.

Further, the head portions of bolts fastening the core 120 and the link 150 contact the elastic solid 130, thus causing the disadvantage that a crack and peeling occur at the bolt insertion holes 132.

DISCLOSURE OF THE INVENTION

The present invention is made in view of the disadvantages of the prior art, and its object is to provide an elastic flat tread capable of preventing an elastic solid from cracking when a vehicle runs on or collides with a rock or a stone, or a curb stone of a sidewalk during traveling.

In order to attain the above object, a first aspect of an elastic flat tread according to the present invention is an elastic flat tread having links of which end portions are connected to the adjacent end portions in a traveling direction of a crawler with a pin, and a core covered with an elastic solid at least on the ground-contacting side, and characterized in that the aforesaid core is any core of a core attached to the aforesaid link and a core attached to a metal plate which is attached to the aforesaid link, and in that end portions in a longitudinal direction of the aforesaid any core are bent toward the side not in contact with the ground.

According to the above structure, even if the vehicle runs on or collides with a protruding object such as a rock or stone, or a curb stone of a sidewalk, since the end portions in a longitudinal direction of the core are bent toward the side not in contact with the ground, the rock or stone escapes from the elastic solid end portion formed along the bent portion of the core, thus making it possible to avoid local concentration of stress on the elastic solid. When the angle of bend of the core end portion is made larger, even if the elastic solid end portion formed along the bent portion collides with a curb stone of a sidewalk, local concentration of stress on the elastic solid can be avoided. The angle of bend of core end portion is appropriately set in the range of 10 degrees to 90 degrees, and the angle of bend of the core end portion is set in consideration of the weights of various kinds of models small to large in size, the sizes of the elastic flat treads, the lengths in the longitudinal direction of the cores, and the like. For example, in a small-sized model which frequently operates in a working site with many small rocks and stones, the angle of bend of the core end portion may be made smaller, and in a large-sized model which frequently operates in a working site with many large rocks and stones, the angle of bent of the core end portion may be larger. Consequently, even if the vehicle runs on a protruding object such as a rock or stone, or a curb stone of a sidewalk during traveling, a crack does not occur in the elastic solid end portion, thus increasing durability of the elastic flat tread.

A second aspect of the invention is characterized in that at least one layer of cable layers is provided inside the aforesaid elastic solid, under the aforesaid any core, near an end portion in a longitudinal direction of the aforesaid any core, in the structure of the first aspect of the invention.

According to the above structure, in addition to the operational effects of the first aspect of the invention, the cable layer is embedded near the end portion in a longitudinal direction of the core, thereby increasing the rigidity at this portion, which eliminates the occurrence of a crack in the elastic solid even if the elastic solid end portion runs on or collides with an protruding object such as a rock or stone, or a curb stone of a sidewalk. Consequently, durability of the elastic flat tread is improved, which makes the elastic flat tread useful to construction equipment operating in various working sites.

A third aspect of the invention is characterized in that a direction in which cable wires of the aforesaid cable layers are placed is either one of the parallel and diagonal directions relative to the longitudinal direction of the aforesaid any core, or the combination of two directions or more selected from the parallel and diagonal directions, in the structure of the second aspect of the invention.

According to the above structure, the elastic solid is strengthened by the cable layer with the direction of the cable wires being either one of or two or more of the parallel and diagonal directions relative to the longitudinal direction of the core, and therefore a crack does not occur in the elastic solid even if the elastic solid end portion runs on or collides with a protruding object such as a rock or stone, or a curb stone of a sidewalk. Consequently, durability of the elastic flat tread is improved, which makes the elastic flat tread useful to construction equipment operating in various working sites.

A fourth aspect of the invention is characterized by including a synthetic resin member which is placed near the end portion in the longitudinal direction of the aforesaid any core, and which is fixed to the aforesaid elastic solid, in the structure of the first aspect of the invention.

According to the above structure, if the synthetic resin member with a smaller friction coefficient is fixed to the elastic solid, a rock or a stone slips and escapes, even if the synthetic resin member runs on a protruding object such as a rock or stone, or a curb stone of a sidewalk, thereby making it possible to avoid local concentration of stress. Further, by using the synthetic resin member with higher rigidity than the elastic solid, rigidity around the core end portion can be increased. Consequently, even if the elastic flat tread runs on a protruding object such as a rock or a stone, or a curb stone of a sidewalk during traveling, a crack does not occur, thus improving durability of the elastic flat tread.

A fifth aspect of the invention is characterized in that the aforesaid elastic solid is integrally formed by elastic solids with different hardnesses, in which the hardness at a portion in contact with the aforesaid any core is the highest and the hardness sequentially lowers toward the ground-contacting side, in the structure of the first aspect of the invention.

According to the aforesaid structure, in addition to the operational effects of the fist aspect of the invention, the elastic solid with a higher hardness is strong against an unbalanced load caused by deflection or the like, but provides poor riding quality and less wear resistance on the other hand, and thus the elastic solid is designed to have the highest hardness at the portion nearest to the core. To make the hardness sequentially lower toward the ground-contacting side, the elastic solid having a lower hardness is provided on the ground-contacting side in consideration of riding quality and wear resistance. Accordingly, even if the elastic solid end portion runs on a protruding object such as a rock or stone, or a curb stone of a sidewalk, a crack does not occur in the elastic solid end portion, thus improving durability of the elastic flat tread.

A sixth aspect of the invention is characterized in that the aforesaid any core is formed of spring steel, in the structure of the first aspect of the invention.

According to the above structure, as in the structure of the first aspect of the invention, the end portions in the longitudinal direction of the core formed of spring steel are bent toward the side not in contact with the ground, and therefore even if the elastic solid end portion formed along the bent portion of the core runs on a protruding object such as a rock or stone, or a curb stone of a sidewalk, the core formed of spring steel is displaced upward, thereby making it possible to avoid local concentration of stress on the elastic solid end portion. Consequently, even if the elastic solid end portion runs on a protruding object such as a rock or stone, or a curb stone of a sidewalk, a crack does not occur, thus improving durability of the elastic flat tread.

A seventh aspect of the invention is characterized in that the ratio between a height h, which is from a mounting surface for the aforesaid link up to a tip end in a height direction of the end portion in the longitudinal direction of the aforesaid any core, and a link pitch Lp is $0.05 \leq h/Lp \leq 0.25$, in the structure of the first aspect of the invention.

An eighth aspect of the invention is characterized in that the ratio between a height h, which is from a mounting surface for the aforesaid link up to a tip end in a height direction of the end portion in the longitudinal direction of the aforesaid any core, and a height H of the elastic flat tread is $0.08 \leq h/H \leq 0.50$, in the structure of the first aspect of the invention.

A ninth aspect of the invention is characterized in that the ratio between a width W1 of the aforesaid any core, and a width W2 of a tip end in the longitudinal direction of the aforesaid any core is $0.5 < W2/W1 \leq 0.9$, in the structure of the first aspect of the invention.

In the above seventh aspect through the ninth aspect of the invention, the dimensional ratio of the core and the like of the first aspect of the invention is specified, and as in the operational effects of the first aspect of the invention, a crack does not occur in the elastic solid end portion, thus improving durability of the elastic flat tread.

A tenth aspect of the invention is, in an elastic flat tread having links of which end portions are connected to the adjacent end portions in a traveling direction of a crawler with a pin, and a core covered with an elastic solid at least on the ground-contacting side, characterized in that the aforesaid core is any core of a core attached to the aforesaid link and a core attached to a metal plate which is attached to the aforesaid link, and is characterized in that at least one layer of cable layers is provided inside the aforesaid elastic solid, under the aforesaid any core, near an end portion in a longitudinal direction of the aforesaid any core.

The above structure corresponds to the structure of the second aspect of the invention of which core is not bent, and thus the same operational effect as in the second aspect of the invention can be obtained.

An eleventh aspect of the invention is characterized in that a direction in which cable wires of the aforesaid cable layers are placed is either one of the parallel and diagonal directions relative to the longitudinal direction of the aforesaid any core, or the combination of two directions or more selected from the parallel and diagonal directions, in the structure of the tenth aspect of the invention.

The above structure corresponds to the structure of the third aspect of the invention, and the same operational effects as in the third invention can be obtained.

A twelfth aspect of the invention is, in an elastic flat tread having links of which end portions are connected to the adjacent end portions in a traveling direction of a crawler with a pin, and a core covered with an elastic solid at least on the ground-contacting side, is characterized in that the aforesaid core is any core of a core attached to. the aforesaid link and a core attached to a metal plate which is attached to the aforesaid link, and characterized by further including a synthetic resin member placed near an end portion in a longitudinal direction of the aforesaid any core and fixed to the aforesaid elastic solid.

The above structure corresponds to the structure of the fourth aspect of the invention of which core is not bent, and thus the same operational effects as in the fourth invention can be obtained.

A thirteenth aspect of the invention is, in an elastic flat tread having links of which end portions are connected to the adjacent end portions in a traveling direction of a crawler with a pin, and a core covered with an elastic solid at least on the ground-contacting side, characterized in that the aforesaid core is any core of a core attached to the aforesaid link and a core attached to a metal plate which is attached to the aforesaid link, and characterized in that the aforesaid elastic solid is integrally formed by elastic solids with different hardness, in which the hardness at a portion in contact with the aforesaid any core is the highest and the hardness sequentially lowers toward the ground-contacting side.

The above structure corresponds to the structure of the fifth aspect of the invention of which core is not bent, and thus the same operational effects as in the fifth aspect of the invention can be obtained.

A fourteenth aspect of the invention is, in an elastic flat tread having links of which end portions are connected to the adjacent end portions in a traveling direction of a crawler with a pin, and a core covered with an elastic solid at least on the ground-contacting side, and is characterized in that the aforesaid core is any core of a core attached to the aforesaid link and a core attached to a metal plate which is attached to the aforesaid link, and characterized in that the aforesaid any core is formed of spring steel.

The above structure corresponds to the structure of the sixth aspect of the invention of which core is not bent, and the same operational effects can be obtained as in the sixth aspect of the invention.

A fifteenth aspect of the invention is, in an elastic flat tread having links of which end portions are connected to the adjacent end portions in a traveling direction of a crawler with a pin, and a core covered with an elastic solid at least on the ground-contacting side, characterized in that end portions in a longitudinal direction of the aforesaid core are bent toward the side not in contact with the ground, and characterized in that end portions of the aforesaid elastic solid are protruded outward relative to the tip ends of the end portions in the longitudinal direction of the aforesaid core.

According to the above structure, when the vehicle runs on or collides with a protruding object such as a rock or stone, or a curb stone of a sidewalk during traveling, the end portion in the longitudinal direction of the core is bent toward the side not in contact with the ground, thus making it possible to avoid local concentration of stress on the elastic solid as a result that the rock or the stone escapes from the elastic solid end portion formed along the bent portion of the core. Since the elastic solid end portion formed along the bent portion of the core is protruded outward from the end portion of the core, therefore in the elastic solid end portion, an impact caused by the collision with an protruding object such as a rock or stone, or a curb stone of a sidewalk can be lessened. Accordingly, even if the vehicle runs on or collides with a protruding objet such as a rock or stone, or a curb stone of a sidewalk during traveling, a crack does not occur in the elastic solid end portion, thus improving durability of the elastic flat tread.

BRIEF DESCRIPTION OF THE DRAWINGS

FIG. 20 is an explanatory view of the essential part of a core of which end portion is bent in two stages; FIG. 21 is an explanatory view of the essential part of another core of which end portion is bent in two stages; FIG. 22 is an explanatory view of the essential part of a core of which end portion is formed with a predetermined curvature radius; FIG. 23 is an explanatory view of the essential part of a core of which end portion is formed with a different curvature radius from that in FIG. 22; and FIG. 24 is an explanatory view of the essential part of a core of which end portion is formed by a plurality of curved surfaces;

BEST MODE FOR CARRYING OUT THE INVENTION

Figure 52:
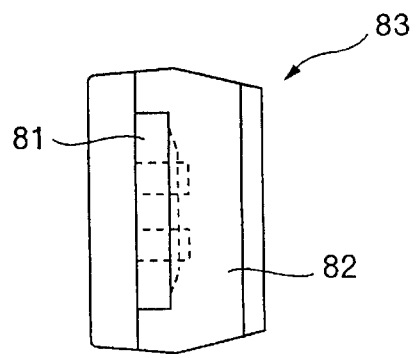
FIG. 52 is a sectional view taken along the 52—52 line in FIG. 51.

An elastic flat tread according to the present invention will be explained below with reference to FIG. 1 through FIG. 52. Initially, a first embodiment of the elastic flat tread will be explained with reference to FIG. 1 through FIG. 4.

Figure 1:
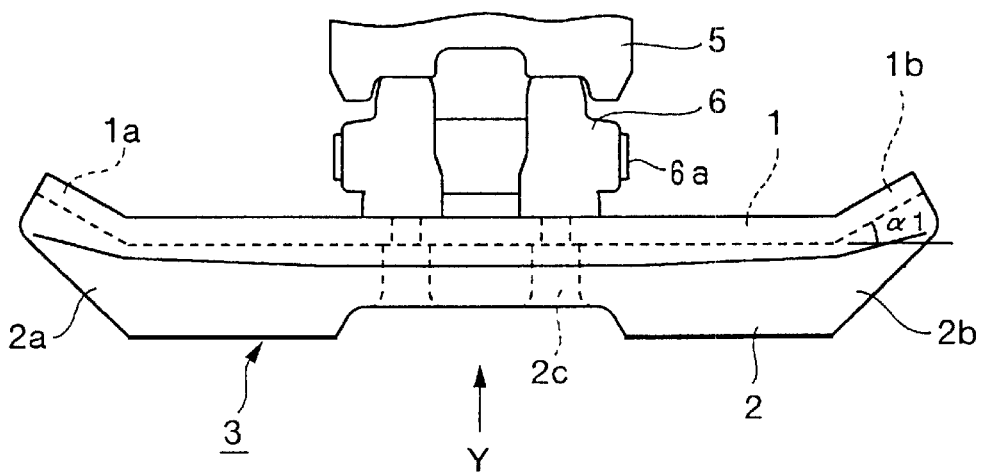
FIG. 1 is an explanatory view of a first embodiment of an elastic flat tread according to the present invention.
Figure 2:
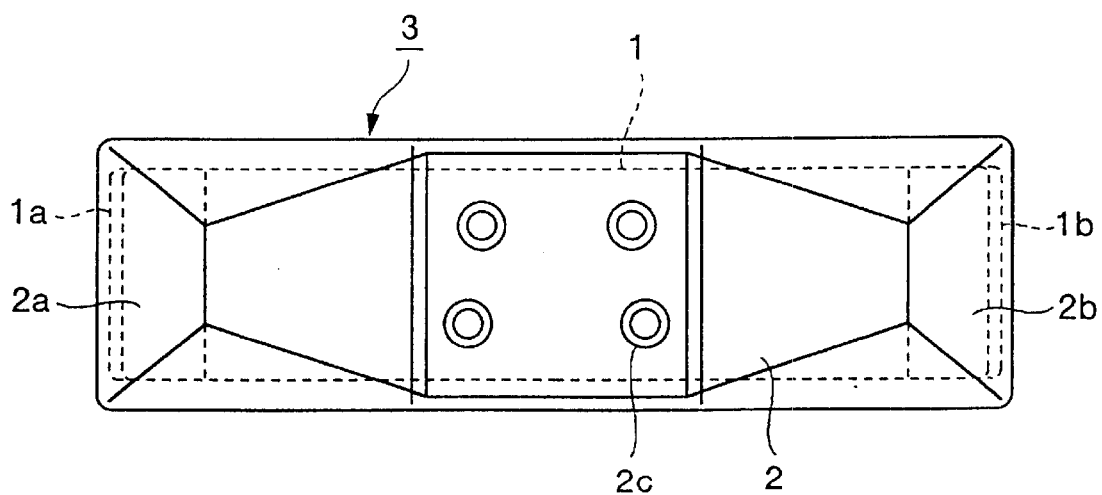
FIG. 2 is a view seen from the arrow Y in FIG. 1.

As FIG. 1 and FIG. 2 show, a core 1 is covered with and bonded to an elastic solid 2 such as rubber. A tread which is formed by the core 1 covered with and bonded to the elastic solid 2 is called an elastic flat tread 3. Bolts not illustrated are inserted into bolt insertion holes 2c provided in the elastic solid 2, thereby attaching the elastic flat tread 3 to a link 6. A number of elastic flat treads 3 are disposed in a traveling direction of a crawler, and end portions of the links 6 adjacent to each other are connected to each other with pins 6a to form an endless crawler belt. A lower roller 5 attached to a vehicle body not illustrated abuts to the tread surface of the link 6 to thereby rotate. The weight of the vehicle body is exerted on the core 1 via the lower roller 5 and the link 6. Consequently, the core 1 is made of a material with high rigidity so as not to be deformed. Core end portions 1a and 1b are bent toward the side not in contact with the ground. An angle of bend $\alpha 1$ in this case is set at, for example, 45 degrees.

Figure 3:
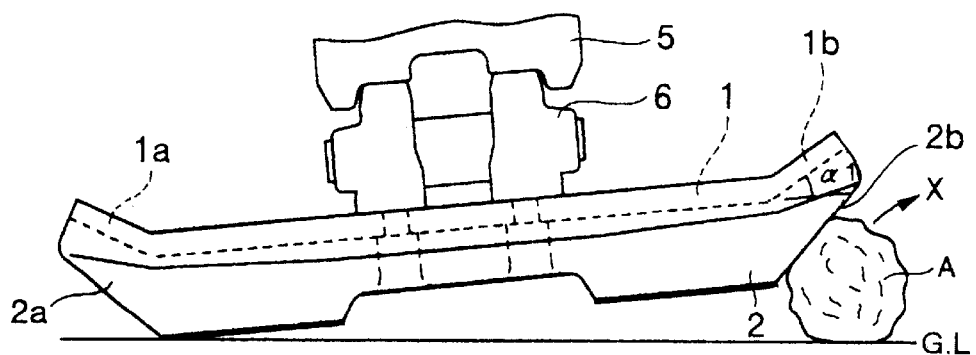
FIG. 3 is a view explaining the traveling state of an elastic flat tread in FIG. 1.

The operation in FIG. 1 and FIG. 2 will be explained based on FIG. 3. As FIG. 3 shows, when the vehicle runs on, or collides with a protruding object such as a rock A or a curb stone during traveling, the end portion 1b in a longitudinal direction of the core 1 is bent toward the side not in contact with the ground, thus allowing, the rock A to escape in the X direction from an elastic solid end portion 2b formed along a bent portion of the core 1. As a result, the elastic solid 2 can avoid the local concentration of stress at the end portion 2b.

In the first embodiment, the angles of bend $\alpha 1$ of the core end portions 1a and 1b are set at 45 degrees, but they can be appropriately set in the range of 10 degrees to 90 degrees. Specifically, the angles of bend $\alpha 1$ of the core end portions 1a and 1b are set in consideration of the weights of various types of vehicles which are small to large in size, the size of the elastic flat tread 3, and the dimension of the core 1 in its longitudinal direction. For example, in a small-sized vehicle which is frequently operated in a work site with a large number of small rocks and stones, it is suitable to reduce the angles of bend $\alpha 1$ of the core end portions 1a and 1b, while in a large-sized vehicle which is frequently operated in a work site with a large number of large rocks and stones, it is suitable to increase the angles of bend $\alpha 1$ of the core end portions 1a and 1b. Thus, even if the vehicle runs on a protruding object such as the rock A and a curb stone, a crack does not occur in the elastic solid end portions 2a and 2b, thereby increasing durability of the elastic flat tread 3.

Figure 4:
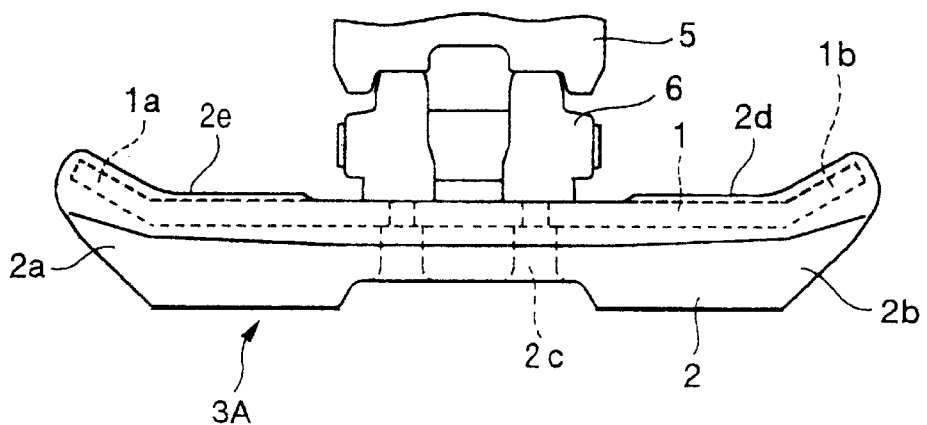
FIG. 4 is an explanatory view of an example in which an a core is covered with and bonded to an elastic solid from the ground-contacting side to the side not in contact with the ground.

An elastic flat tread 3A shown in FIG. 4 is an example in which the sides of the core end portions 1a and 1b, which are not in contact with the ground, are also covered with and bonded to end portions 2e and 2d of the elastic solid 2. In the other points, the elastic flat tread 3A has the same structure and effects as the elastic flat tread 3 in FIG. 1, therefore omitting the explanation thereof.

According to the structure in FIG. 4, compared to the elastic flat tread 3 in the first embodiment in FIG. 1, the core 1 is covered with and bonded to the elastic solid 2 up to the sides not in contact with the ground, thus preventing the core 1 and the elastic solid 2 from peeling away.

Subsequently, a second embodiment of the elastic flat tread will be explained with reference to FIG. 5 through FIG. 8.

Figure 5:
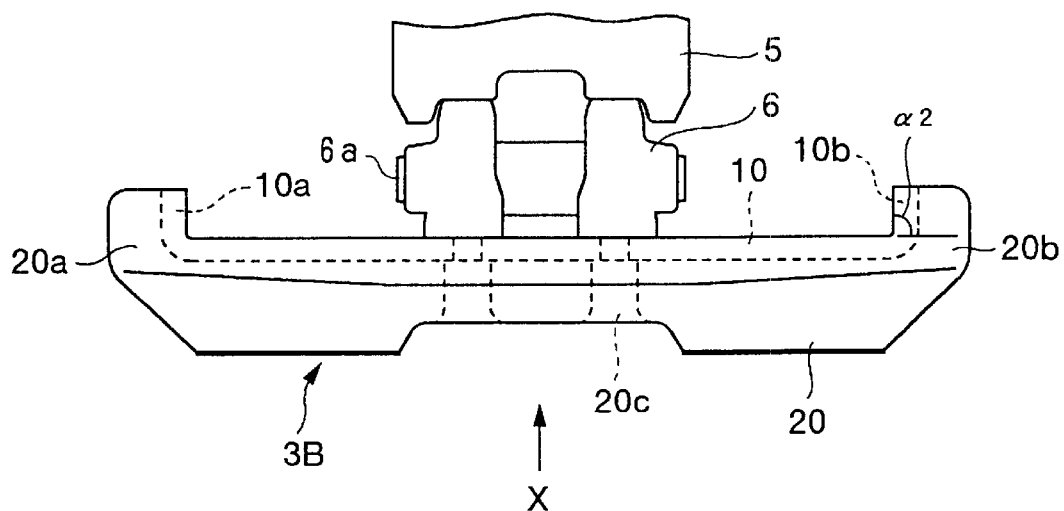
FIG. 5 is an explanatory view of a second embodiment of the elastic flat tread according to the present invention.
Figure 6:
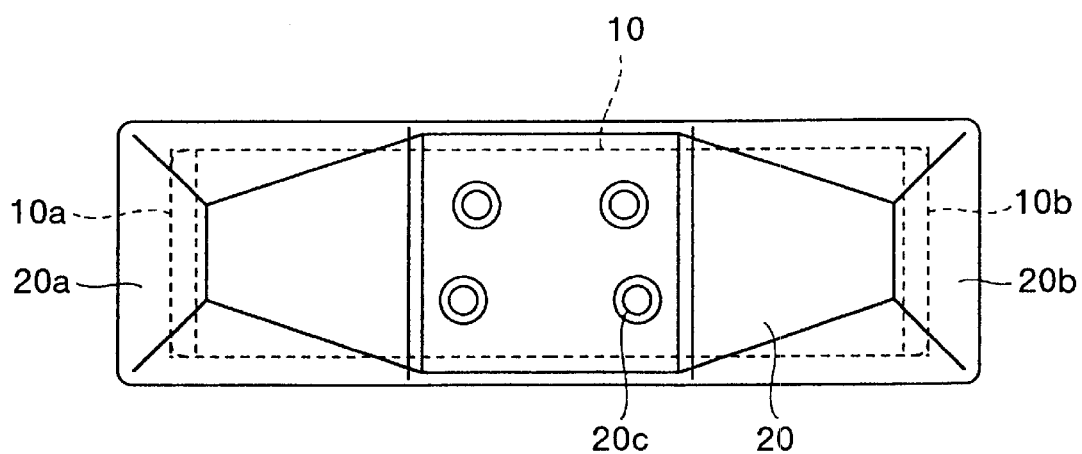
FIG. 6 is a view seen from the arrow X in FIG. 5.

As FIG. 5 and FIG. 6 show, a core 10 is covered with and bonded to an elastic solid 20 such as rubber. A tread which is formed by the core 10 covered with and bonded to the elastic solid 20 is called an elastic flat tread 3B. Bolts not illustrated are inserted into bolt insertion holes 20c provided in the elastic solid 20 to thereby attach the elastic flat tread 3B to the link 6. A number of elastic flat treads 3B are disposed in a traveling direction of a crawler, and end portions of the links 6 adjacent to each other are connected to each other with pins 6a to thereby form an endless crawler belt. The lower roller 5 attached to the vehicle body not illustrated abuts to the tread surface of the link 6 to thereby rotate. The weight of the vehicle body is exerted on the core 10 via the lower roller 5 and the link 6. Consequently, the core 10 is made of a material with high rigidity so as not to be deformed. Core end portions 10a and 10b are bent toward the side not in contact with the ground. An angle of bend α2 in this case is set at 90 degrees.

Figure 7:
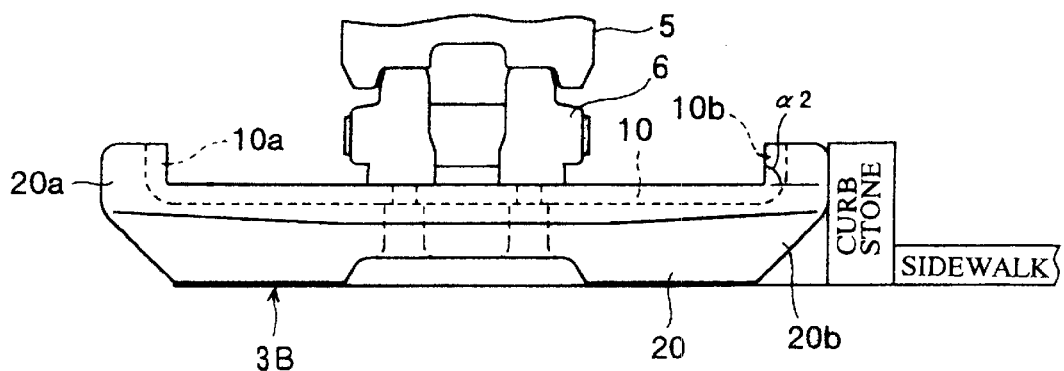
FIG. 7 is a view explaining the traveling state of the elastic flat tread in FIG. 5.

The operation in FIG. 5 and FIG. 6 will be explained based on FIG. 7. Even if the vehicle collides with, or runs on a curb stone of a sidewalk or the like during traveling, since the end portion 10b in a longitudinal direction of the core 10 is bent toward the side not in contact with the ground, the elastic solid 20 can avoid the local concentration of stress at an end portion 20b owing to the elastic effect of the elastic solid end portion 20b formed along the bent portion of the core 10. As a result, a crack does not occur in the elastic solid end portions 20a and 20b, thereby increasing durability of the elastic flat tread 3B. As in the first embodiment, the angles of bend α2 of the core end portions 10a and 10b are appropriately set in the range of 10 degrees to 90 degrees.

Figure 8:
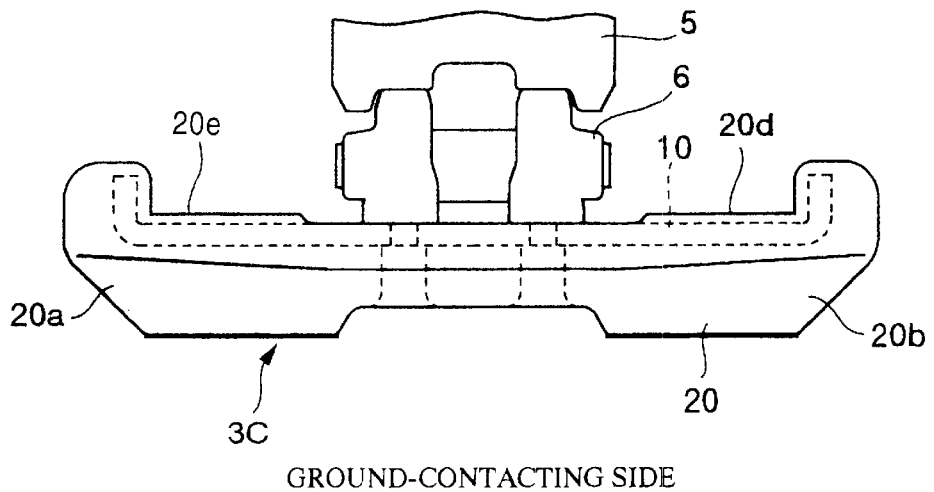
FIG. 8 is an explanatory view of an example in which the core in FIG. 5 is covered with and bonded to the elastic solid from the ground-contacting side to the side not in contact with the ground.

An elastic flat tread 3C shown in FIG. 8 is an example in which the sides of the core end portions 10a and 10b, which are not in contact with the ground, are covered with and bonded to end portions 20e and 20d of the elastic solid 20. In the other points, the elastic flat tread 3C has the same structure and effects as the elastic flat tread 3B in FIG. 5, therefore omitting the explanation thereof.

According to the structure in FIG. 8, compared to the elastic flat tread 3B in the second embodiment in FIG. 5, the core 10 is covered with and bonded to the elastic solid 20 up to the sides not in contact with the ground, thus preventing the core 10 and the elastic solid 20 from peeling away.

Next, the shapes of the cores according to the elastic flat tread of the present invention will be explained with reference to FIG. 9 through FIG. 13. Only the end portions on one side of the cores are shown in FIG. 9 through FIG. 13, and it is noted that the end portions on both sides are formed in the same shape.

Figure 9:
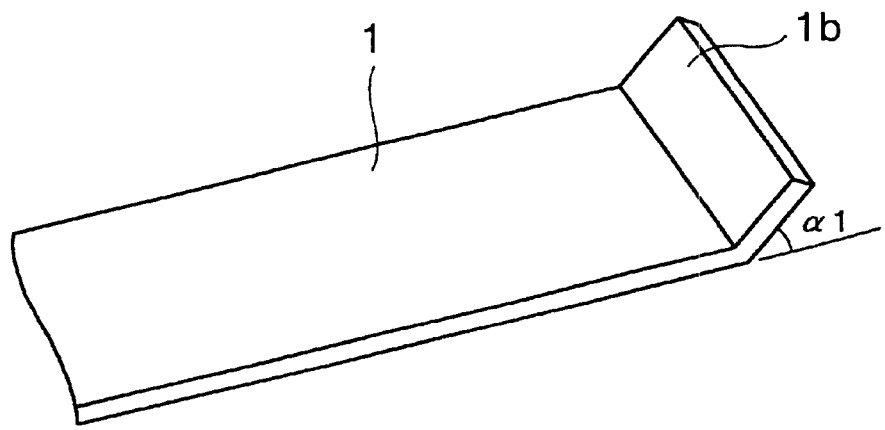
FIG. 9 is a view explaining a first example of the core according to the present invention.
Figure 10:
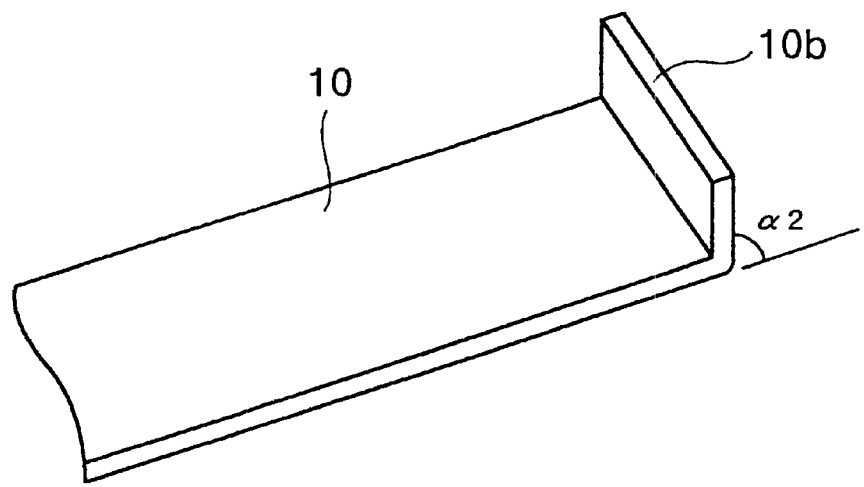
FIG. 10 is a view explaining a second example of the core according to the present invention.

FIG. 9 shows the core 1 shown in the first embodiment in FIG. 1, and the angle of bend α1 at the core end portion 1b is set at 45 degrees. FIG. 10 shows the core 10 shown in the second embodiment in FIG. 5, and the angle of bend α2 at the core end portion 10b is set at 90 degrees.

Figure 11:
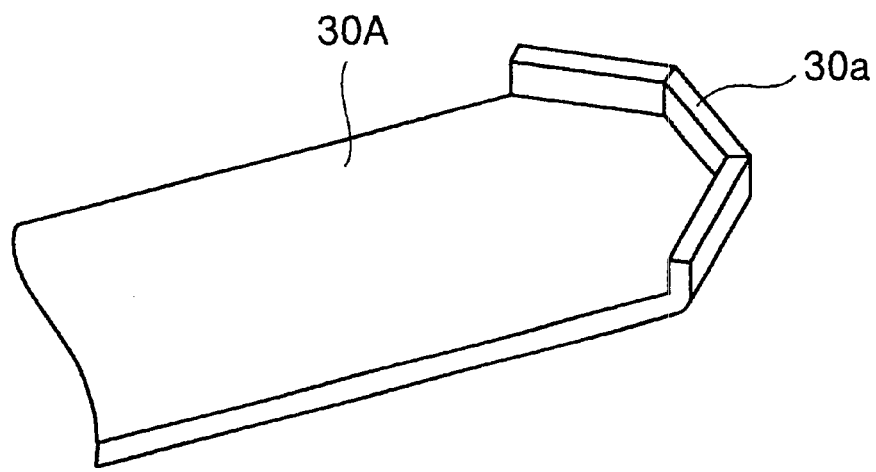
FIG. 11 is a view explaining a third example of the core according to the present invention.
Figure 12:
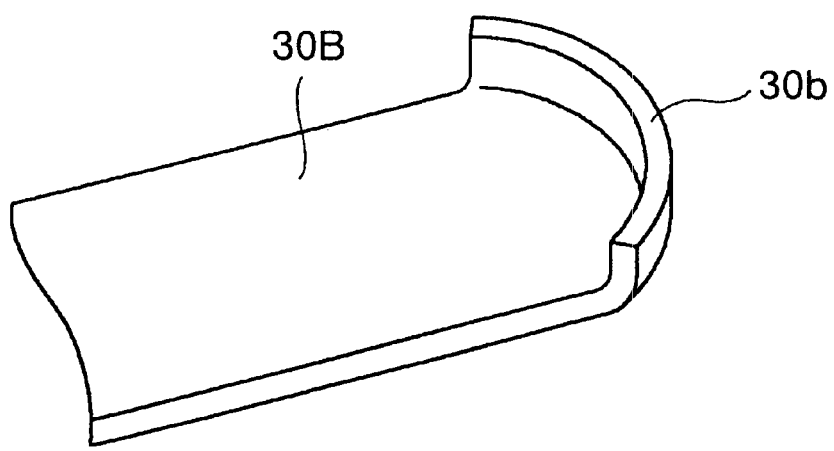
FIG. 12 is a view explaining a fourth example of the core according to the present invention.
Figure 13:
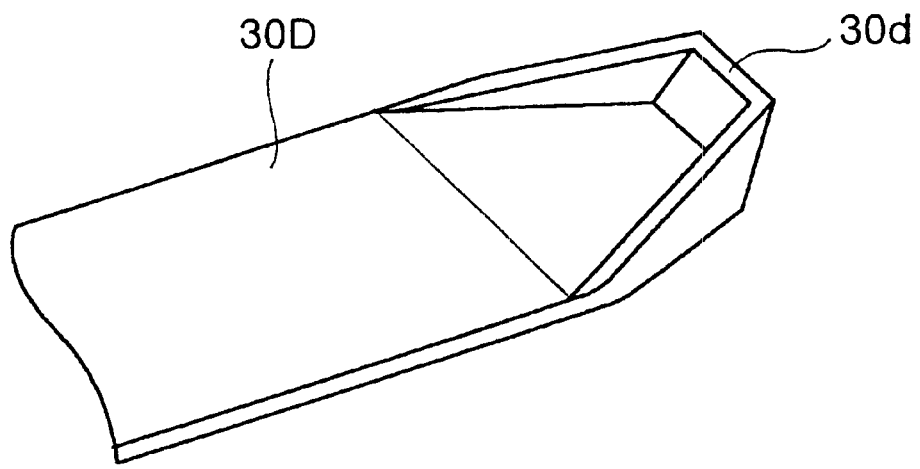
FIG. 13 is a view explaining a fifth example of the core according to the present invention.

A core 30A in FIG. 11 shows an example in which a square end portion 30a is formed. A core 30B in FIG. 12 shows an example in which a circular end portion 30b is formed. A core 30D in FIG. 13 shows an example in which an end portion 30d in a shape of the bottom of a ship is formed.

Figure 14:
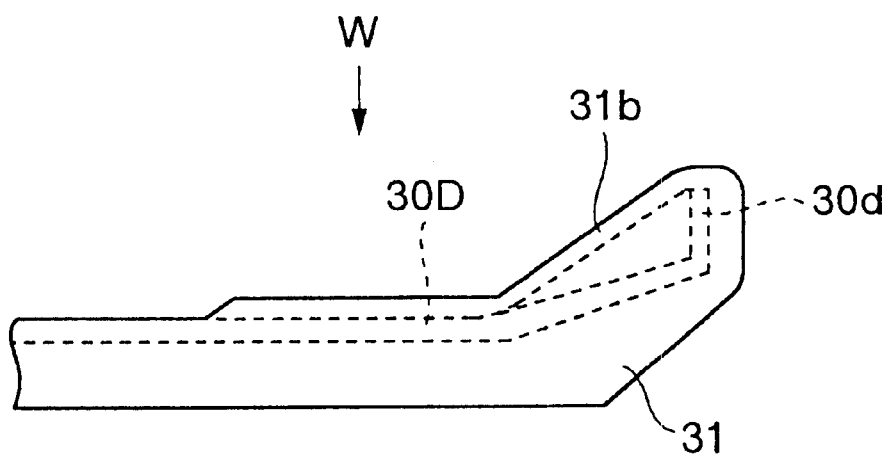
FIG. 14 is an explanatory view of the core in FIG. 13 being covered with and bonded to the elastic body.
Figure 15:
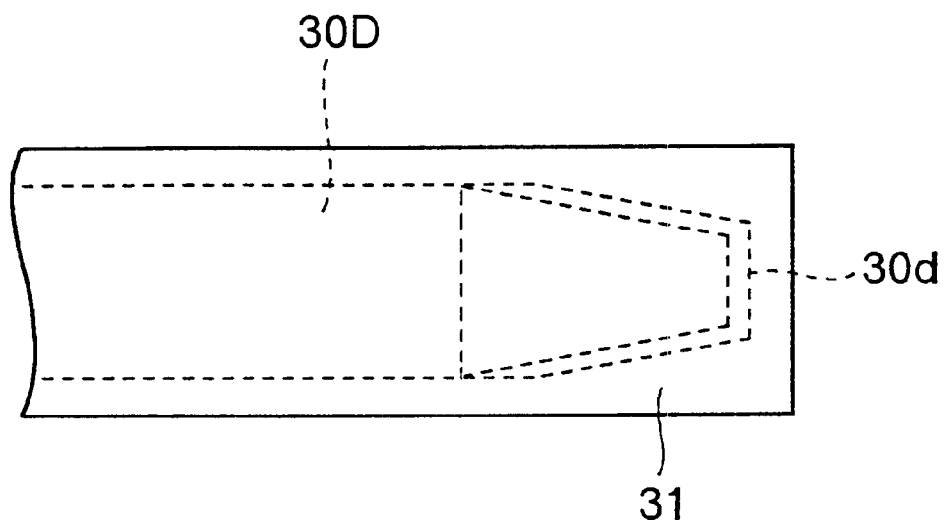
FIG. 15 is a view seen from the arrow W in FIG. 14.

With the core 30D shown in FIG. 13 cited as an example, the structure of the covering of the elastic solid will be explained. Since the cores shown in FIG. 9 through FIG. 12 have the same structure, the explanation thereof will be omitted. As FIG. 14 and FIG. 15 show, an elastic solid 31 covers and bonds to the core 30D from the ground-contacting side to an end portion 31b on the side not in contact with the ground. In such a elastic flat tread, the same effects can be obtained as in the embodiments shown in FIG. 1 and FIG. 5.

Figure 16:
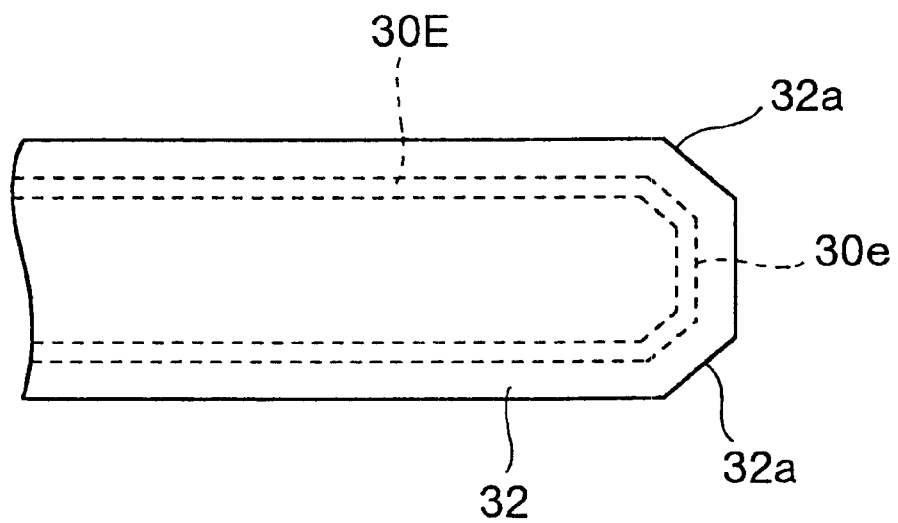
FIG. 16 is a view explaining another elastic flat tread according to the present invention.

FIG. 16 shows a plan view of another elastic flat tread according to the present invention, in which an elastic solid 32 covers and bonds to a core 30E. An end portion 30e of the core 30E is formed to be square, and corner portions 32a and 32a are formed at the end portion of the elastic solid 32 for covering and bonding to the core end portion 30e. As a result that the corner portions 32a and 32a are formed, a crack and the like do not occur in the elastic solid 32 even if the elastic flat tread collides with, or runs on a protruding object such as a rock and stone.

Subsequently, a third embodiment of the elastic flat tread will be explained with reference to FIG. 17 through FIG. 24.

Figure 17:
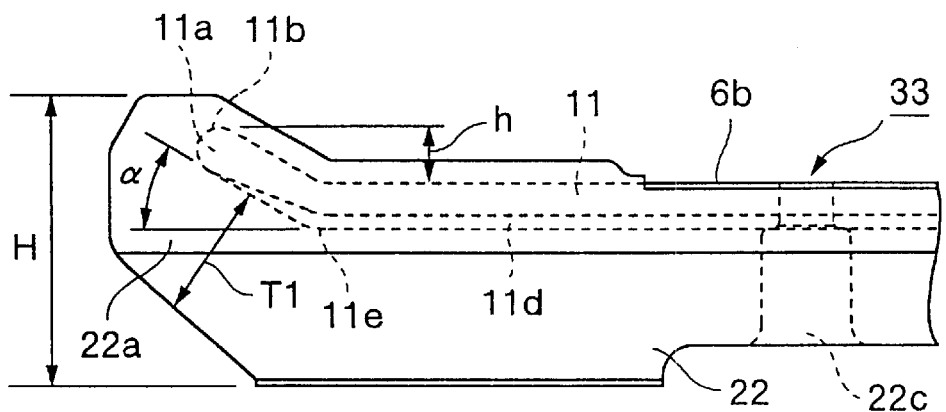
FIG. 17 is an explanatory view of an essential part of a third embodiment of the elastic flat tread according to the present invention.
Figure 18:
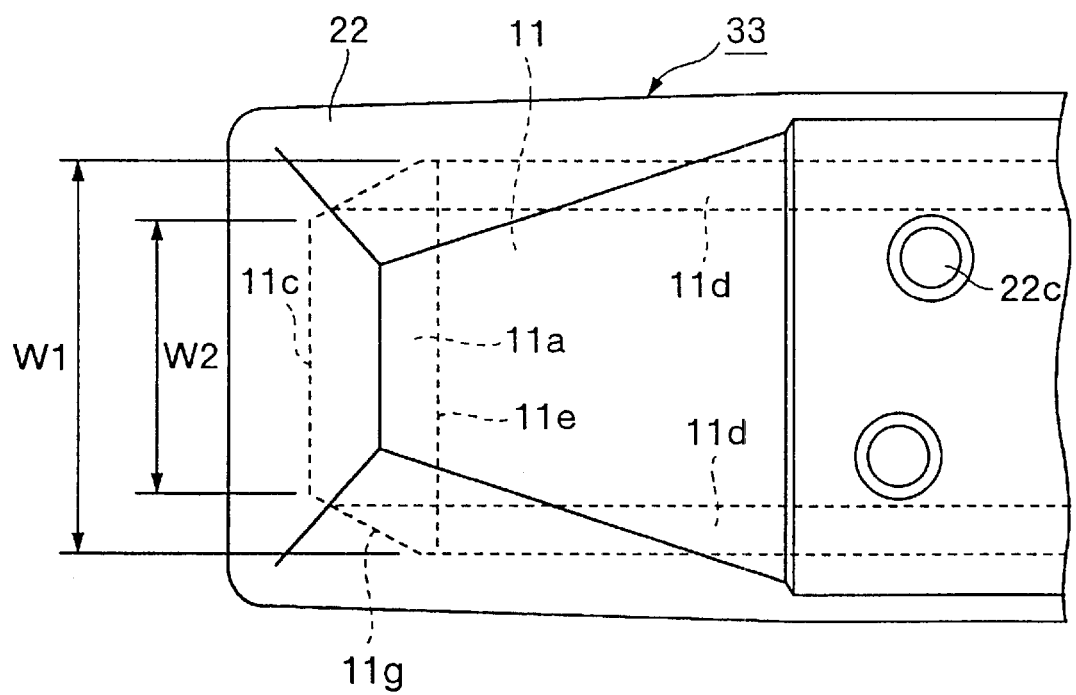
FIG. 18 is an explanatory view of the essential part, in which the elastic flat tread in FIG. 17 is seen from the ground-contacting side.

As FIG. 17 and FIG. 18 show, in the elastic flat tread 33, a core 11 other than a link mounting surface 6b is covered with and bonded to an elastic solid 22 such as rubber. Only one side of the elastic flat tread 33 is illustrated, and the other side is omitted, since the other side is in a form symmetrical with the one side. In the elastic flat tread 33, the link 6 (See FIG. 1) is attached on the link mounting surface 6b with bolts being inserted into bolt insertion holes 22c provided in the elastic solid 22. As in the first embodiment, the elastic flat treads 33 form an endless crawler belt.

The core 11 is made of a material with high rigidity so as not to be deformed, and the end portion 11a is bent toward the side not in contact with the ground at a predetermined angle of bend α. The core end portion 11a is formed in such a shape that tapers toward a tip end 11c in a longitudinal direction of the core 11. In the third embodiment, chamfered portions 11d are formed on the ground-contacting side at both ends in a lateral direction of the core 11, but they may be omitted.

Figure 19:
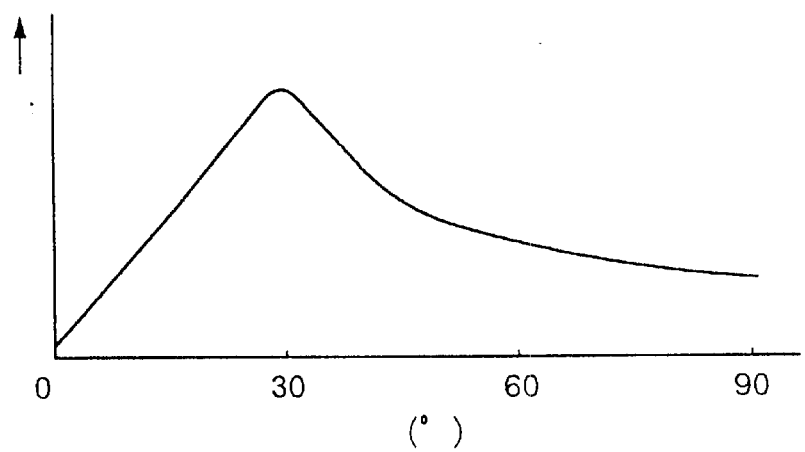
FIG. 19 is a diagram regarding the durability evaluation of the elastic flat tread in FIG. 17.
Figure 53:
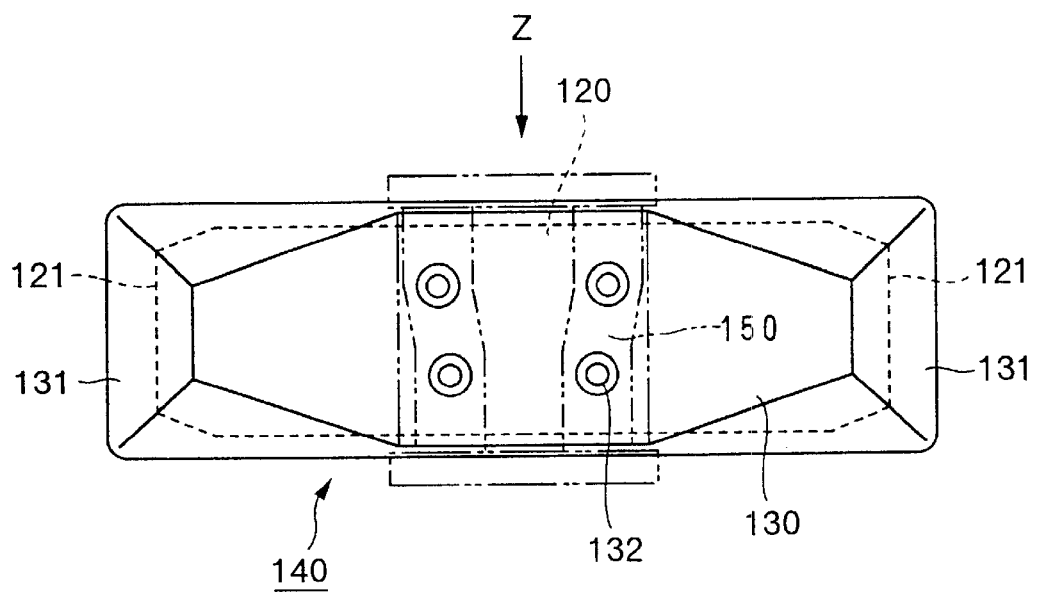
FIG. 53 is a plan view of a conventional elastic flat tread seen from the ground-contacting side.
Figure 54:
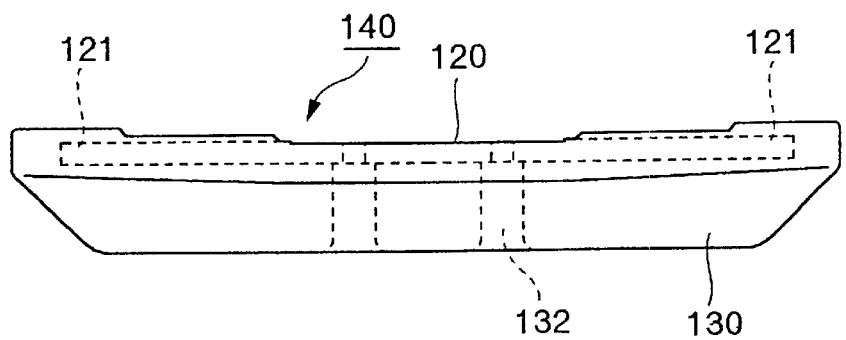
FIG. 54 is a view seen from the arrow Z in FIG. 53.
Figure 55:
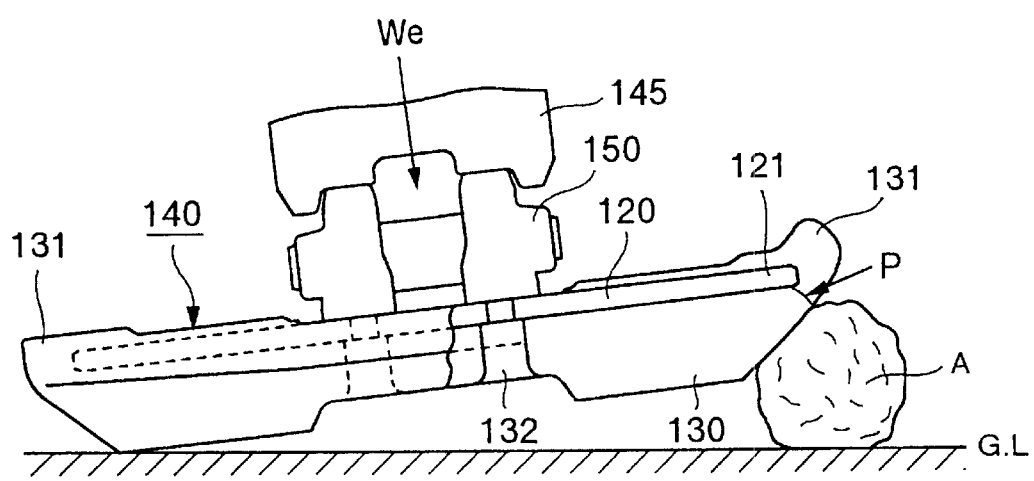
FIG. 55 is a view explaining a problem occurring to the conventional elastic flat tread flat during traveling.

The characteristics of the elastic flat tread 33 according to the above structure will be explained. FIG. 19 shows the relationship between the angle of bend α of the core end portion 11a, and the durability evaluation index regarding a crack occurrence in the elastic solid end portion 22a. Here, the durability evaluation index of the angle of bend α=0° is the data of a conventional elastic flat tread, which is almost the same as an elastic flat tread 140 shown in FIG. 53. As is obvious from FIG. 19, the core end portion 11a is bent toward the side not in contact with the ground, thereby increasing the durability against a crack occurrence in the elastic solid end portion 22a.

Consequently, the durability increases at the angle of bend α>0° as compared with the prior art (the angle of bend α=0°), and in obtaining excellent durability, $10° \leq$ the angle of bend $\alpha \leq 90°$ is preferable. Further, in order to achieve a suitable thickness for an elastic solid thickness T1 shown in FIG. 17, it is more preferable that the angle of bend $\alpha \leq 15°$, specifically, $15° \leq$ the angle of bend $\alpha \leq 90°$. Meanwhile, in order to reduce the concentration of stress occurring at the elastic solid end portion 22a near a bent portion 11e (See FIG. 17), it is more preferable that the angle of bend $\alpha \leq 45°$, specifically, $15° \leq$ the angle of bend $\alpha \leq 45°$. From the above, in obtaining extremely excellent durability, it is still more preferable that $15° \leq$ the angle of bend $\alpha \leq 45°$.

As a factor of the durability evaluation index, the relationship with the angle of bend α is explained, but other factors may be used. For example, the explanation can be made by the relationship between a height h shown in FIG. 17, specifically, the height h from the link mounting surface 6b up to a tip end 11b in a height direction of the core end portion 11a, and a link pitch, specifically, the distance between axes of the pins 6a and 6a (See FIG. 1) for connecting the links 6 and 6 (See FIG. 1) adjacent in a fore-and-aft direction of the crawler traveling direction (hereinafter called a link pitch Lp). In this case, an excellent durability evaluation index can be obtained when $0.05 \leq h/$ $Lp \leq 0.25$. Further, in order to achieve an appropriate thickness for the elastic solid thickness T1, it is more preferable that $h/Lp \geq 0.09$. Meanwhile, in order to reduce the adverse possibility that interference may occur between the elastic flat tread 33 and components around the vehicle body or the like, it is more preferable that $h/Lp \leq 0.13$. Accordingly, it is a still more preferable condition that $0.09 \leq h/Lp \leq 0.13$.

Further, as another factor of the durability evaluation index, the relationship between the above height h and a height H of the elastic flat tread 33 shown in FIG. 17 may be suitable. In this case, a preferable durability evaluation index can be obtained when $0.08 \leq h/H \leq 0.5$. Further, in order to achieve an appropriate thickness for the elastic solid thickness T1, it is more preferable that $h/H \geq 0.16$. Meanwhile, in order to reduce the adverse possibility of the interference as in the above, it is more preferable that $h/H \leq 0.23$. Accordingly, it is a still more preferable condition that $0.16 \leq h/H \leq 0.23$.

Further, as still another factor of the durability evaluation index, the relationship between a width W1 of the core 11 shown in FIG. 18 and a width W2 of the tip end 11c in a longitudinal direction of the core 11 may be suitable. In this case, a preferable durability evaluation index can be obtained when $0.5 \leq W2/W1 \leq 0.9$. Further, in order to reduce the concentration of stress occurring at the elastic solid end portion 22a near the tip end 11c in the longitudinal direction when the vehicle runs on a protruding object such as a rock and stone, it is more preferable that $W2/W1 \geq 0.65$. Meanwhile, in order to reduce the concentration of stress occurring at the elastic solid end portion 22a near a corner portion 11g of the core end portion 11a when the vehicle runs on a protruding object, it is more preferable that $W2/W1 \leq 0.8$. Accordingly, it is a still more preferable condition that $0.65 \leq W2/W1 \leq 0.80$.

Figure 20:
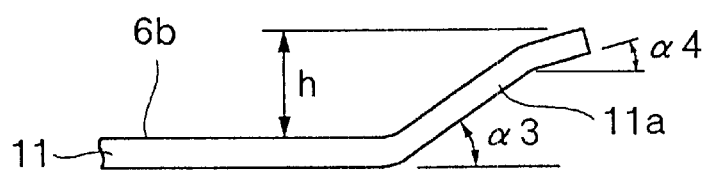
FIG. 20 to FIG. 24 show examples of the core shapes applied to the third embodiment of the elastic flat tread of the present invention.
Figure 21:
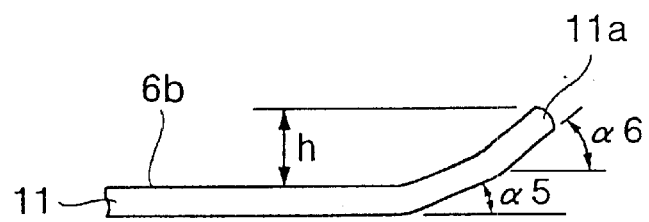
Figure 22:
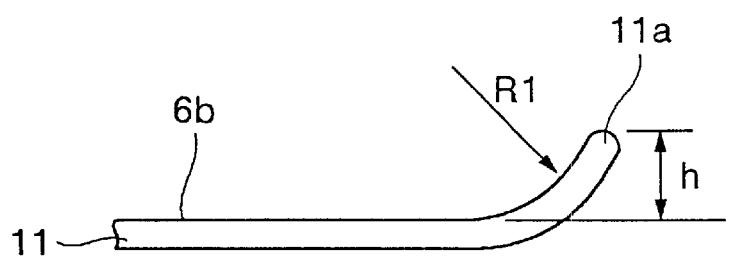
Figure 23:
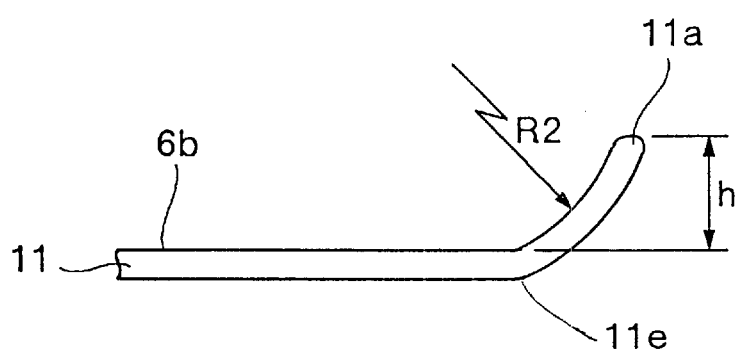
Figure 24:
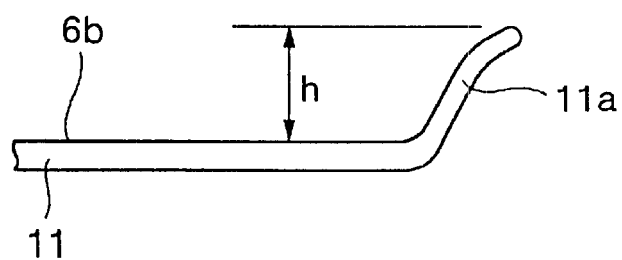

Regarding the core 11 in the third embodiment, the shapes other than that in FIG. 17 will be explained with reference to FIG. 20 to FIG. 24. In the core 11 in FIG. 20, the core end portion 11a is bent at two kinds of angles of bend α3 and α4, and α3>α4. In the core 11 in FIG. 21, the core end portion 11a is bent at two kinds of angles of bend α5 and α6, and α5<α6. FIG. 20 and FIG. 21 show the examples in which the core end portion 11a is bent in two stages, but the core end portion 11a may be bent in three stages or more as necessary. The core 11 in FIG. 22 has a structure in which the core end portion 11a is formed with a radius of curvature R1 and the core end portion 11a is in contact with the core 11. The core 11 in FIG. 23 shows the example in which the core end portion 11a is formed with a radius of curvature R2 and the core end portion 11a forms the bent portion 11e. The core 11 in FIG. 24 shows the example in which the core end portion 11a is formed by a plurality of curved surfaces. The core end portion 11a in FIG. 24 may be a combination of curved surfaces and flat surfaces.

Next, a fourth embodiment of the elastic flat tread will be explained with reference to FIG. 25 through FIG. 27.

An elastic flat tread 3F is formed by a core 40 covered with and bonded to an elastic solid 50 such as rubber. The elastic flat tread 3F is fastened to the link 6 by bolts not illustrated being inserted into bolt insertion holes 50c provided in the elastic solid 50. An end portion 50b of the elastic solid 50 is in a form protruding outward relative to an end portion 40b of the core 40. A cable layer 60A is placed inside the elastic solid 50 and under the core 40.

Figure 26:
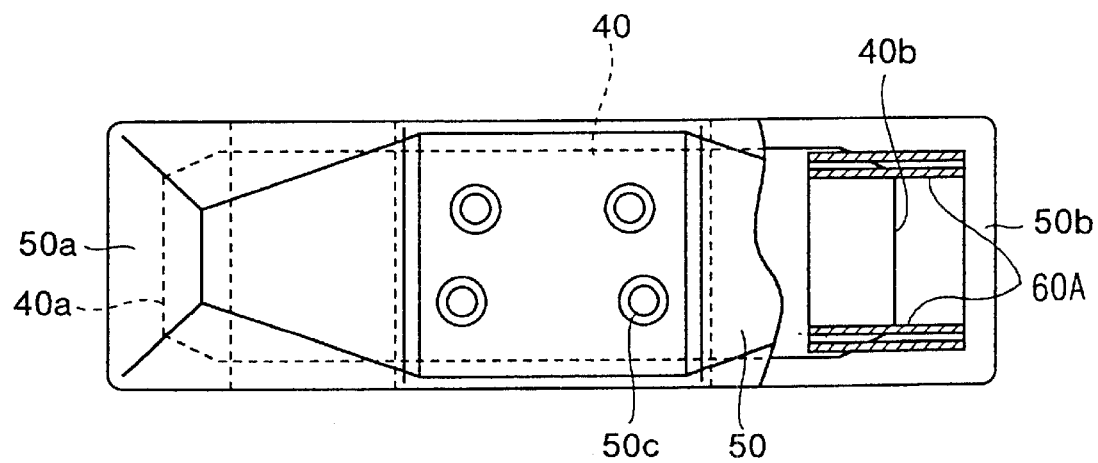
FIG. 26 is a view seen from the arrow V in FIG. 25.
Figure 27:
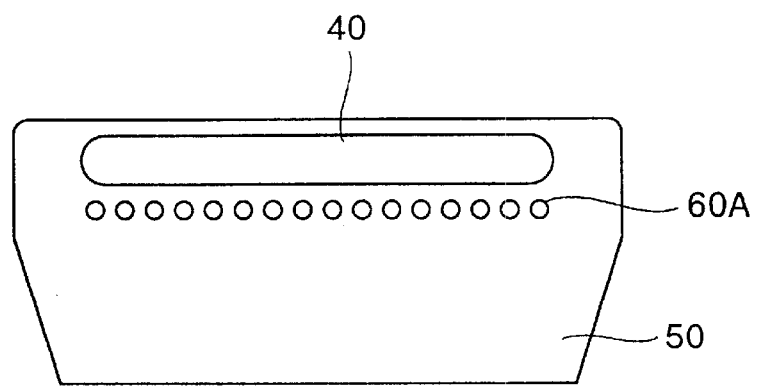
FIG. 27 is a sectional view taken along the 27—27 line in FIG. 25.

As FIG. 26 and FIG. 27 show, the cable layer 60A consisting of a plurality of cable wires parallel with the core 40 is placed under the core 40.

Figure 25:
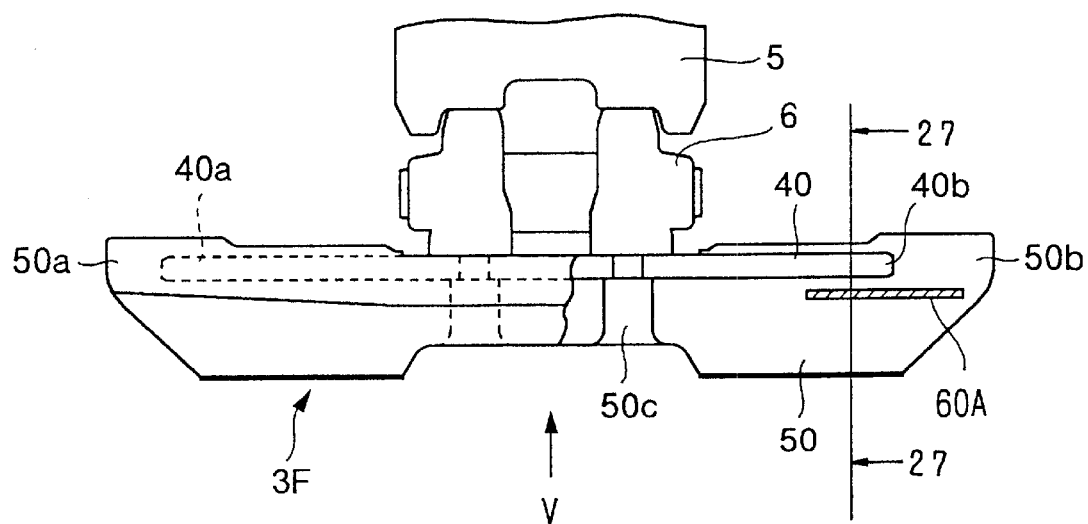
FIG. 25 is an explanatory view of a fourth embodiment of the elastic flat tread according to the present invention.

FIG. 25 shows the cable layer 60A embedded in the elastic solid 50 only on one side, specifically, only on the outer side of the vehicle, but it may be provided on both sides. The length of the portion of an end portion 50a of the elastic solid 50, which is protruded outward from an end portion 40a of the core 40, and the length of the portion of the end portion 50b of the elastic solid 50, which is protruded outward from the end portion 40b of the core 40 may be symmetric. The lengths? of the portion protruded outward may be asymmetric as in FIG. 25. The above is appropriately designed in consideration of the weights of various model from small to large in size, the size of the elastic flat tread 3 and the like.

The operation of FIG. 25 through FIG. 27 will be explained. As a result that the cable layer 60A is embedded near the end portion 40b in the longitudinal direction of the core 40, rigidity increases in this portion. Thereby, even if the elastic solid end portion 50b runs on or collides with a protruding object such as a rock and stone, a curb stone of a sidewalk and the like, a crack does not occur at the elastic solid end portion 50b. Further, since the elastic solid end portion 50b is protruded outward relative to the end portion 40b of the core 40, even if the elastic solid end portion 50b collides with a protruding object such as a curb stone of a sidewalk or the like during traveling, the impact caused by the collision with the protruding object can be lessened. As described above, even if the elastic flat tread 3F runs on or collides with a protruding object such as a curb stone of a sidewalk or the like during traveling, a crack does not occur at the elastic solid end portion 50b, thus increasing durability of the elastic flat tread 3F.

Figure 28:
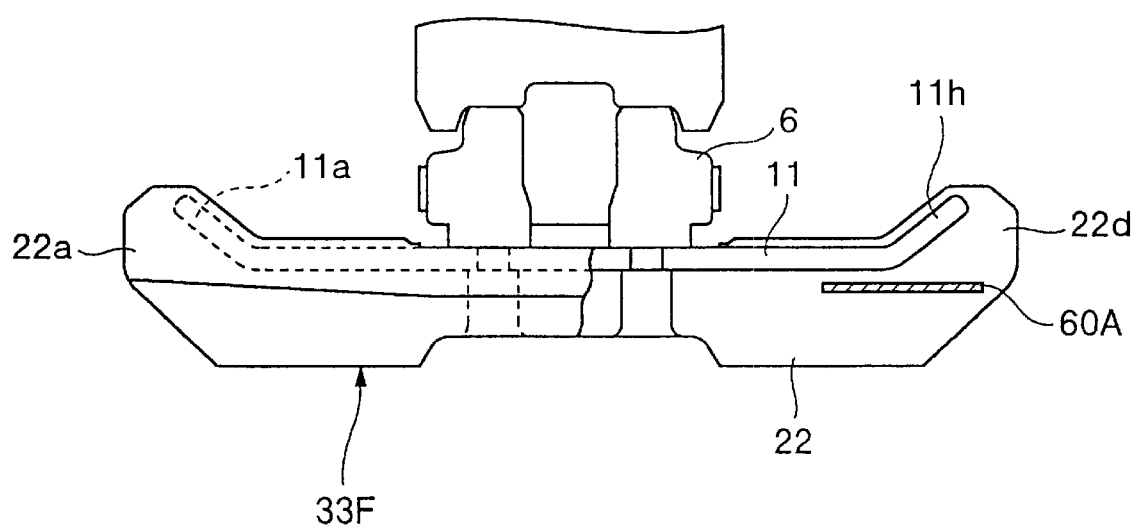
FIG. 28 is an explanatory view of an application of the fourth embodiment of the elastic flat tread according to the present invention.

As an application of the fourth embodiment, the cable layer 60A may be provided in the elastic flat tread 33 (See FIG. 17). For example, as FIG. 28 illustrates, in an elastic flat tread 33F, the cable layer 60A is embedded inside an end portion 22d of the elastic solid 22 under an end portion 11h in the longitudinal direction of the core 11. According to the above structure, as in the above, durability of the elastic flat tread 33F is increased.

A fifth embodiment of the elastic flat tread will be explained with reference to FIG. 29 and FIG. 30.

An elastic flat tread 3E is formed by the core 40 covered with and bonded to the elastic solid 50 such as rubber. The elastic flat tread 3E is attached to the link 6 by bolts not illustrated being inserted into the bolt insertion holes 50c provided in the elastic solid 50. The end portion 50b of the elastic body 50 is formed to protrude outward relative to the end portion 40b of the core 40. A cable layer 60B is diagonally placed inside the elastic solid 50 and under the core 40. FIG. 29 and FIG. 30 show only one layer of the cable layer 60B, but the configuration with a plurality of layers of the cable layers 60B may be suitable.

Figure 29:
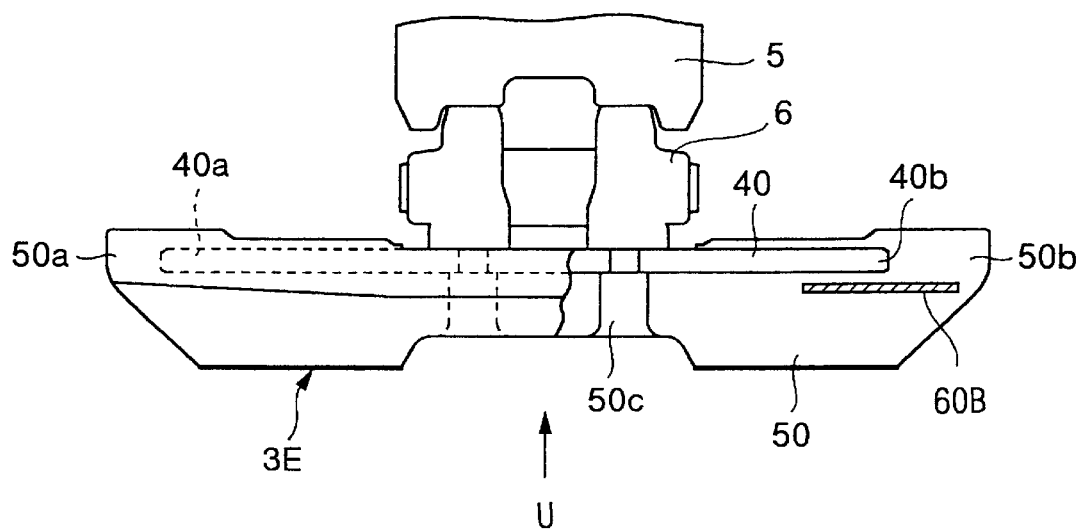
FIG. 29 is an explanatory view of a fifth embodiment of the elastic flat tread according to the present invention.
Figure 30:
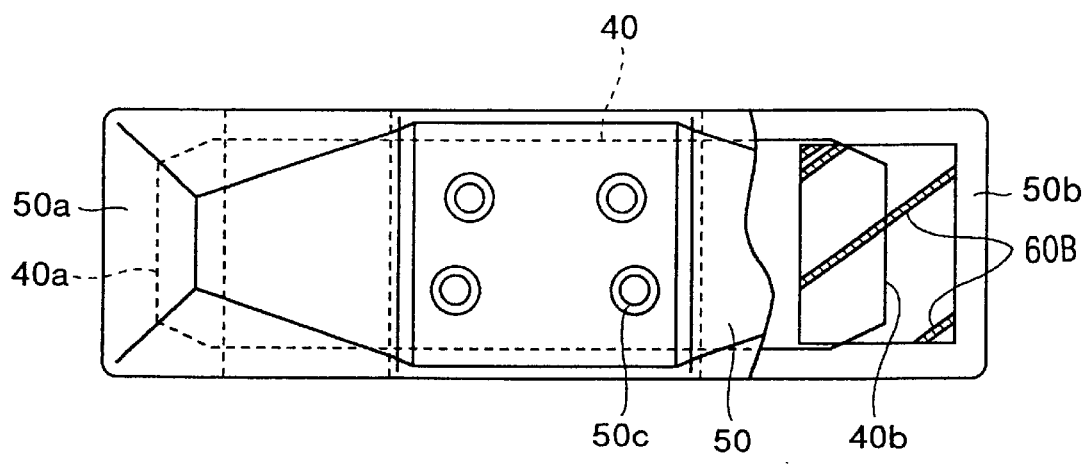
FIG. 30 is a view seen from the arrow U in FIG. 29.

FIG. 29 shows the cable layer 60B embedded in the elastic solid 50 only on one side, but it may be provided on both sides. The length of the portion of the end portion 50a of the elastic solid 50, which is protruded outward from the end portion 40a of the core 40, and the length of the portion of the end portion 50b of the elastic solid 50, which is protruded outward from the end portion 40b of the core 40 may be symmetric. The lengths of the portions protruded outward may be asymmetric as in FIG. 29.

The operation in FIG. 29 and FIG. 30 will be explained. The cable layer 60B consisting of a plurality of cable wires diagonally placed is embedded near the end portion 40b in the longitudinal direction of the core 40. As the result, rigidity increases in the area near the portion where it is embedded, and thus even if the elastic solid end portion 50b runs on, or collides with a protruding object, a crack does not occur at the elastic solid end portion 50b. Further, since the elastic solid end portion 50b is protruded outward relative to the end portion 40b of the core 40, even if the elastic solid end portion 50b collides with a curb stone of a sidewalk or the like during traveling, the impact caused by the collision with the curb stone or the like can be lessened. As the result, as in the above embodiment, a crack does not occur at the elastic solid end portion 50b, thus increasing durability of the elastic flat tread 3E.

A sixth embodiment of the elastic flat tread will be explained with reference to FIG. 31 and FIG. 32.

An elastic flat tread 3G is formed by the core 40 covered with and bonded to the elastic solid 50 such as rubber. The elastic flat tread 3G is attached to the link 6 by bolts not illustrated being inserted into the bolt insertion holes 50c provided in the elastic solid 50.

The end portion 50b of the elastic body 50 is formed to protrude outward relative to the end portion 40b of the core 40. Two layers of cable layers 60C are placed inside the elastic solid 50 and under the core 40. The first cable layer 60C is a cable layer with a plurality of cable wires being diagonally placed. A plurality of cable wires of the second cable layer 60C are placed diagonally in the reverse direction relative to the diagonal direction of the cable wires of the first cable layer 60C so as to cross the cable wires of the first cable layer 60C.

Figure 31:
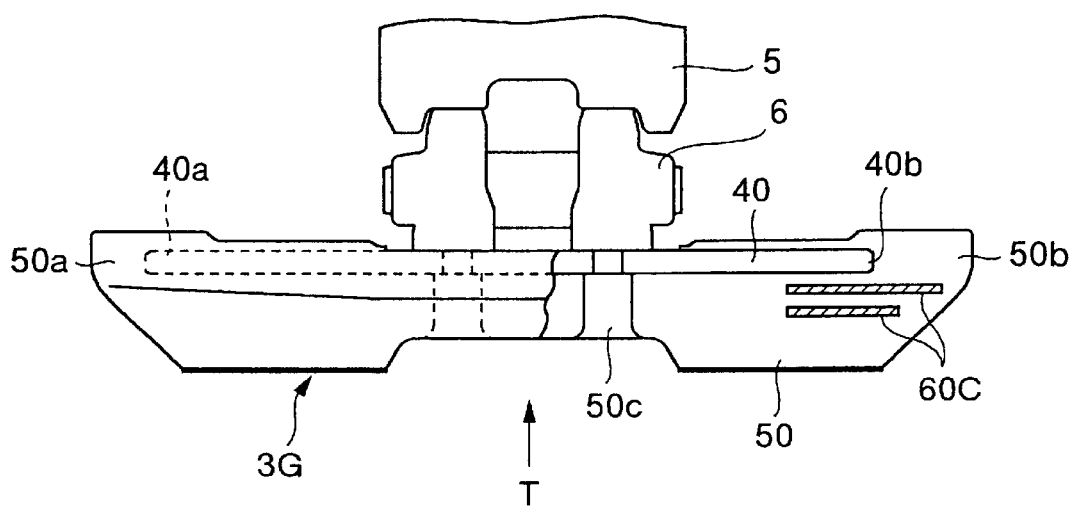
FIG. 31 is an explanatory view of a sixth embodiment of the elastic flat tread according to the present invention.
Figure 32:
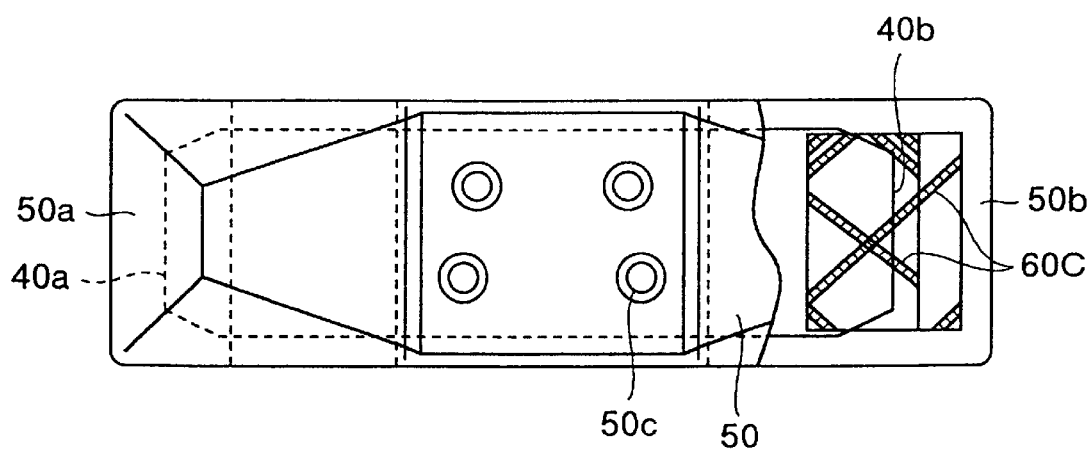
FIG. 32 is a view seen from the arrow T in FIG. 31.

FIG. 31 and FIG. 32 show two layers of the cable layers 60C, but three or more layers of the cable layers 60C may be placed.

Further, the cable layers 60C embedded in the elastic solid 50 at only one side is illustrated, but they may be provided at both sides.

The operation in FIG. 31 and FIG. 32 will be explained.

A plurality of the cable layers 60C each having a different placement direction of the cable wires are embedded near the end portion 40b in the longitudinal direction of the core 40, thus increasing rigidity in the area near the portion where they are embedded. As a result, as in the fifth embodiment, a crack does not occur at the elastic solid end portion 50b, thus increasing durability of the elastic flat tread 3G.

Figure 33:
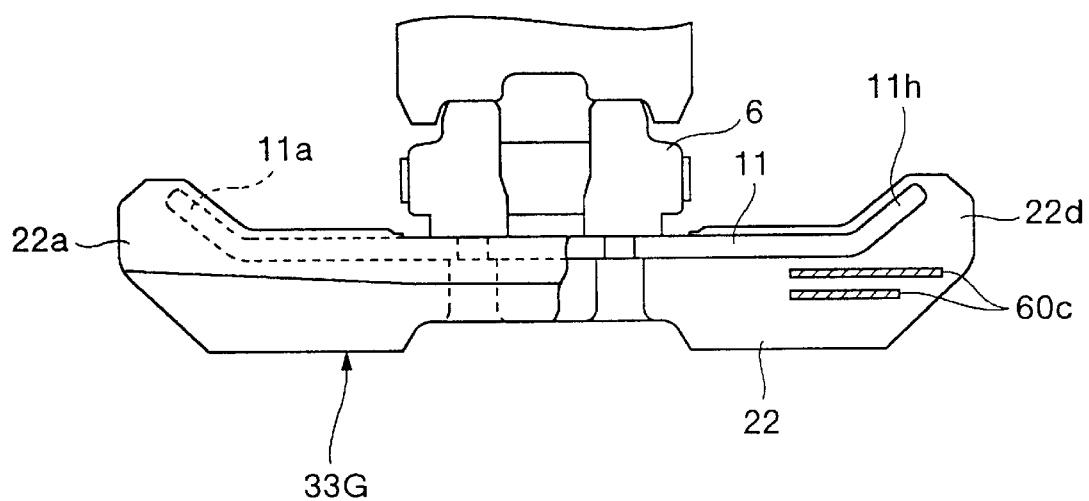
FIG. 33 is an explanatory view of an application of the sixth embodiment of the elastic flat tread according to the present invention.

As an application of the sixth embodiment, a plurality of the cable layers 60C may be provided in the elastic flat tread 33 (See FIG. 17). For example, as FIG. 33 illustrates, in an elastic flat tread 33G, two layers of the cable layers 60C are embedded inside the end portion 22d of the elastic solid 22 under the end portion 11h in the longitudinal direction of the core 11. According to the above structure, as in the above, durability of the elastic flat tread 33G is increased.

A seventh embodiment of the elastic flat tread will be explained with reference to FIG. 34 and FIG. 35.

In an elastic flat tread 3H, the core 40 is covered with and bonded to the elastic solid 50 such as rubber as in FIG. 29. A plurality of cable layers 60D are placed in parallel inside the elastic solid 50 and under the core 40. FIG. 34 shows three layers of the cable layers 60D, but four or more layers of the cable layers 60D may be placed. FIG. 34 shows only one side of the elastic flat tread 3H, but as in the aforesaid embodiment, the cable layers 60D embedded in the elastic solid 50 may be provided at both sides. Further, the length of the portion of the end portion 50b of the elastic solid 50, which is protruded outward from the end portion 40b, may be symmetric or asymmetric. The above is appropriately designed in consideration of the weights of various kinds of models small to large in size, the size of the elastic flat tread 3H and the like. According to the above structure, as in the fifth embodiment, a crack does not occur at the elastic solid end portion 50b, thus increasing durability of the elastic flat tread 3H.

Figure 36:
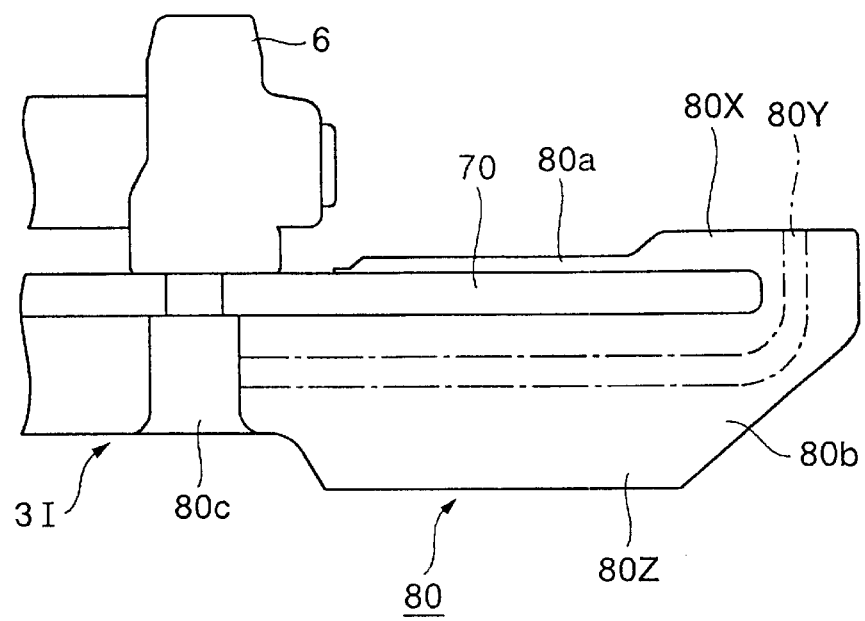
FIG. 36 is an explanatory view of an eighth embodiment of the elastic flat tread according to the present invention.

An eighth embodiment of the elastic flat tread will be explained with reference to FIG. 36.

An elastic flat tread 3I is formed by a core 70 covered with and bonded to an elastic solid 80 such as rubber. The elastic flat tread 3I is attached to the link 6 by bolts not illustrated being inserted into bolt insertion holes 80c provided in the elastic solid 80. The core 70 is covered with and bonded to the elastic solid 80 including an elastic solid end portion 80a on the side not in contact with the ground from the ground-contacting side to the side not in contact with the ground. Thereby, the elastic solid 80 is prevented from peeling away from the core 70. The elastic solid 80 is integrally formed by elastic solids with different hardnesses so that the hardness of the portion nearest to the core 70 is the highest and the hardness lowers gradually toward the ground-contacting side.

An elastic solid 80X forming the portion nearest to the core 70, an elastic solid 80Z forming the portion nearest to the ground-contacting side, and an elastic solid 80Y forming the middle portion between the elastic solid 80X and the elastic solid 80Z are respectively set at a hardness HS of 90, a hardness HS of 70, and a hardness HS of 80. The hardnesses of the elastic solids 80X, 80Y, and 80Z are appropriately set according to the specifications such as the weights of various kinds of models small to large in size, and the like.

The operation in FIG. 36 will be explained. The elastic solid 80 with a higher hardness is strong against unbalanced load caused by defection or the like, but provides poor riding quality and less abrasive resistance on the other hand. Therefore, the elastic solid 80X nearest to the core 70 is given the highest hardness. The hardness is sequentially lowered toward the ground-contacting side, and the portion at the ground-contacting side of the elastic solid 80 is formed by the elastic solid 80Z with a lower hardness in consideration of riding quality and abrasive resistance. Consequently, even if the elastic flat tread 3I runs on an protruding object such as a rock and stone, and a curb stone of a sidewalk during traveling, a crack does not occur at an elastic solid end portion 80b, thus increasing durability of the elastic flat tread 3I.

Figure 37:
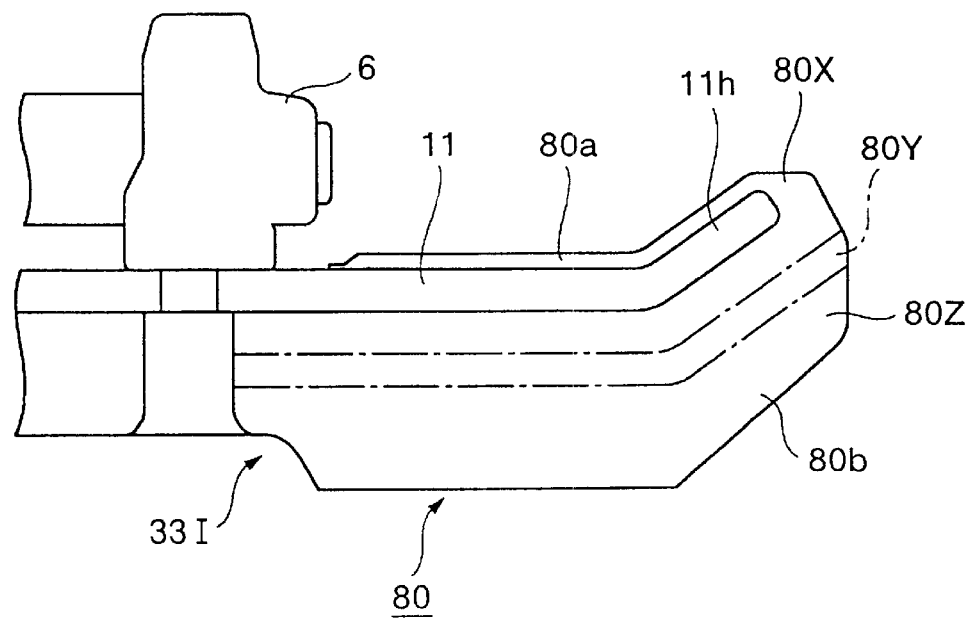
FIG. 37 is an explanatory view of an application of the eighth embodiment of the elastic flat tread according to the present invention.

As an application of the eighth embodiment, the elastic solid 80 may be applied to the elastic flat tread 33 (See FIG. 17). For example, as FIG. 37 illustrates, the elastic solid 80 of an elastic flat tread 33I is integrally formed by the elastic solids 80X, 80Y, and 80Z with different hardnesses so that the hardness of the portion nearest to the core 11 including the core end portion 11h is the highest, and the hardness sequentially lowers toward the ground-contacting side. According to the above structure, as in the above, durability of the elastic flat tread 33I is increased.

Figure 38:
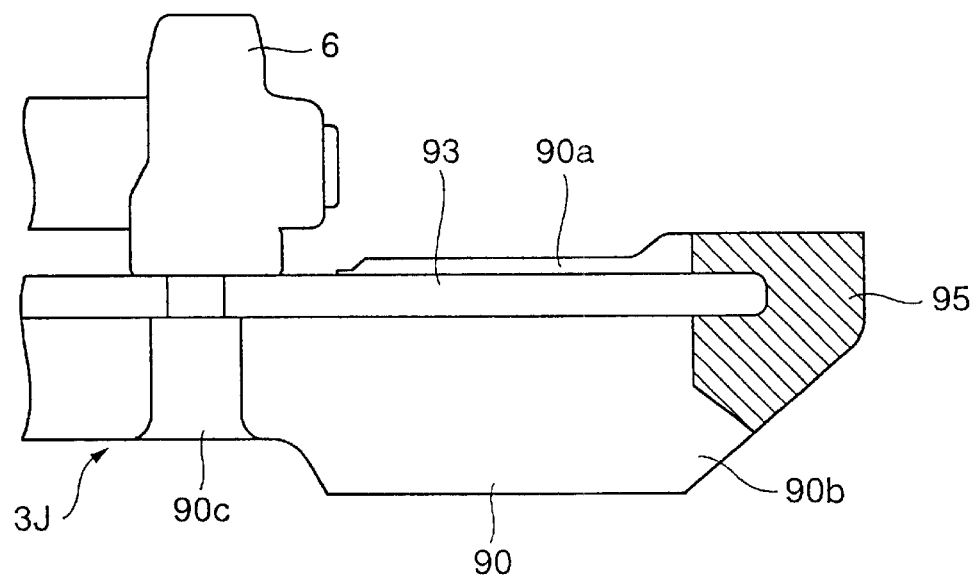
FIG. 38 is an explanatory view of a ninth embodiment of the elastic flat tread according to the present invention.

A ninth embodiment of the elastic flat tread will be explained with reference to FIG. 38.

An elastic flat tread 3J is formed by a core 93 being covered with and bonded to an elastic solid 90. The elastic flat tread 3J is attached to the link 6 by bolts not illustrated being inserted in bolt insertion holes 90c provided in the elastic solid 90. The elastic flat tread 3J includes a synthetic resin member 95 fixed to the elastic solid 90 near an end portion in a longitudinal direction of the core 93. The synthetic resin member 95 is provided near one end portion in the longitudinal direction of the core 93, or near both ends portions thereof.

The operation in FIG. 38 will be explained. If a material with a lower coefficient of friction is used for the synthetic resin member 95 which is fixed to the elastic solid 90, even if the synthetic resin member 95 runs on a protruding object such as a rock and stone, and a curb stone of a sidewalk, the rock or the stone slips and escapes therefrom, thereby making it possible to avoid local concentration of stress in the synthetic resin member 95 and an elastic solid end portion 90b. As a result, a crack does not occur even if the elastic flat tread 3J runs on an protruding object such as a rock and stone, and a curb stone of a sidewalk during traveling, thus increasing durability of the elastic flat tread 3J.

Figure 39:
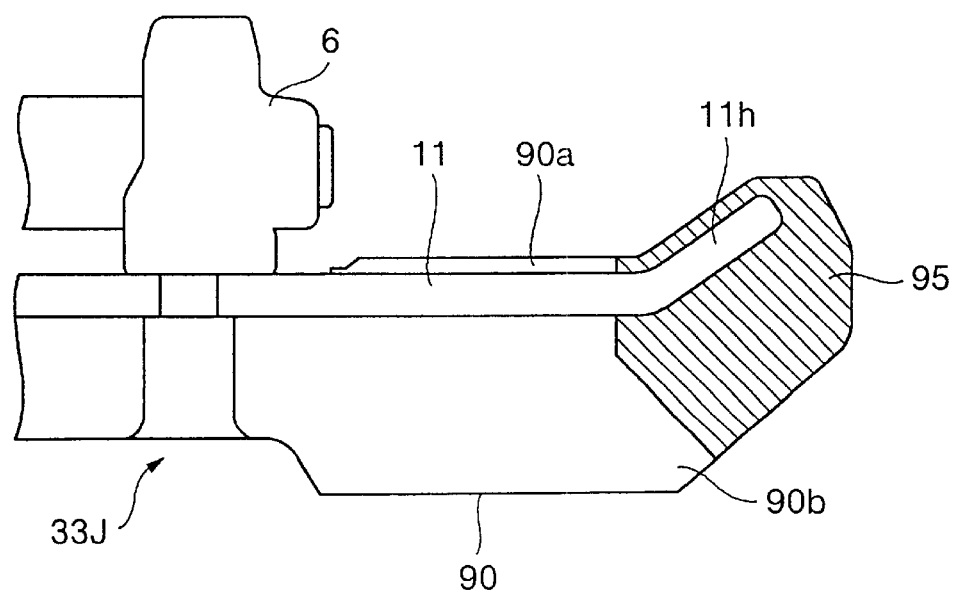
FIG. 39 is an explanatory view of an application of the ninth embodiment of the elastic flat tread according to the present invention.

As an application of the ninth embodiment, the synthetic resin member 95 may be applied to the elastic flat tread 33 (See FIG. 17). For example, as FIG. 39 illustrates, an elastic flat tread 33J includes the synthetic resin member 95 fixed to the elastic solid 90 near the end portion 11h in the longitudinal direction of the core 11. According to the above structure, as in the above, durability of the elastic flat tread 33I is increased.

Figure 40:
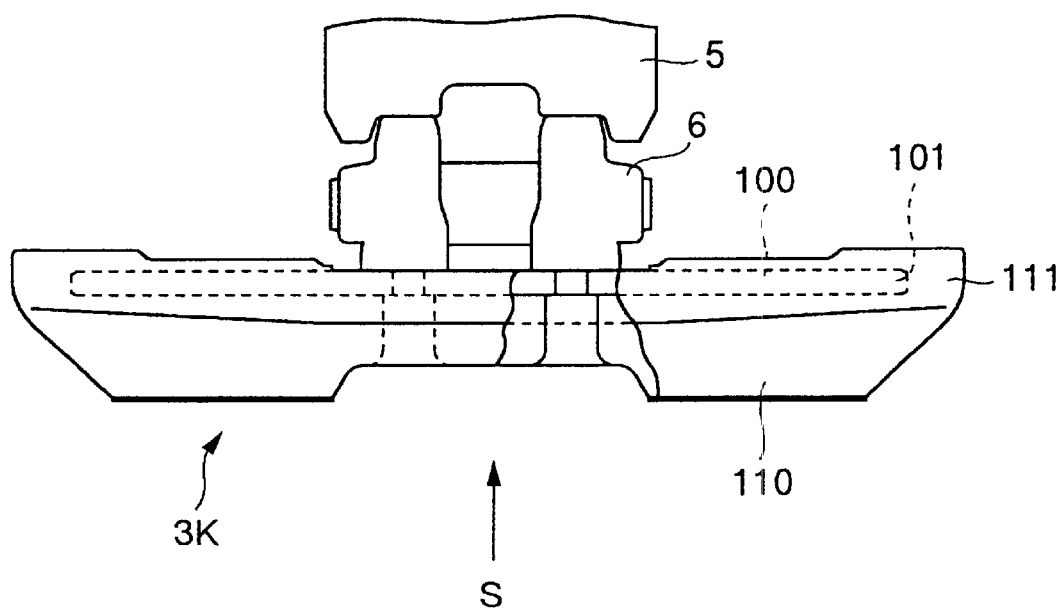
FIG. 40 is an explanatory view of a tenth embodiment of the elastic flat tread according to the present invention.
Figure 41:
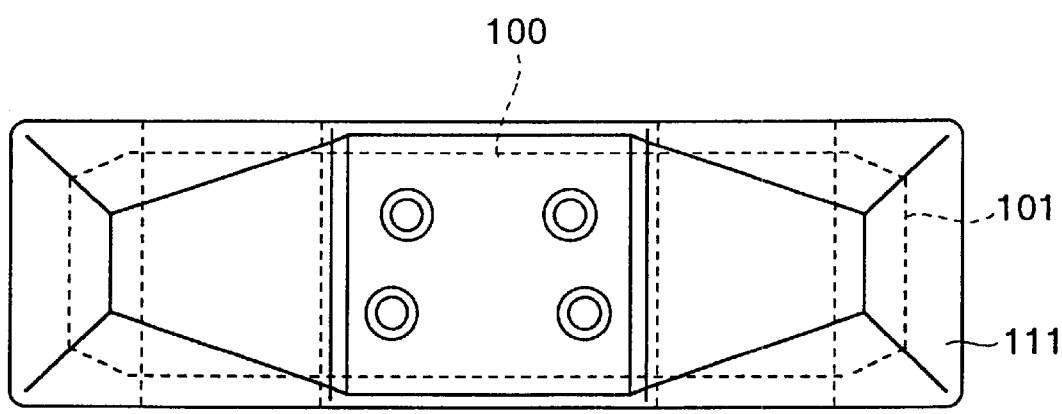
FIG. 41 is a view seen from the arrow S in FIG. 40.
Figure 42:
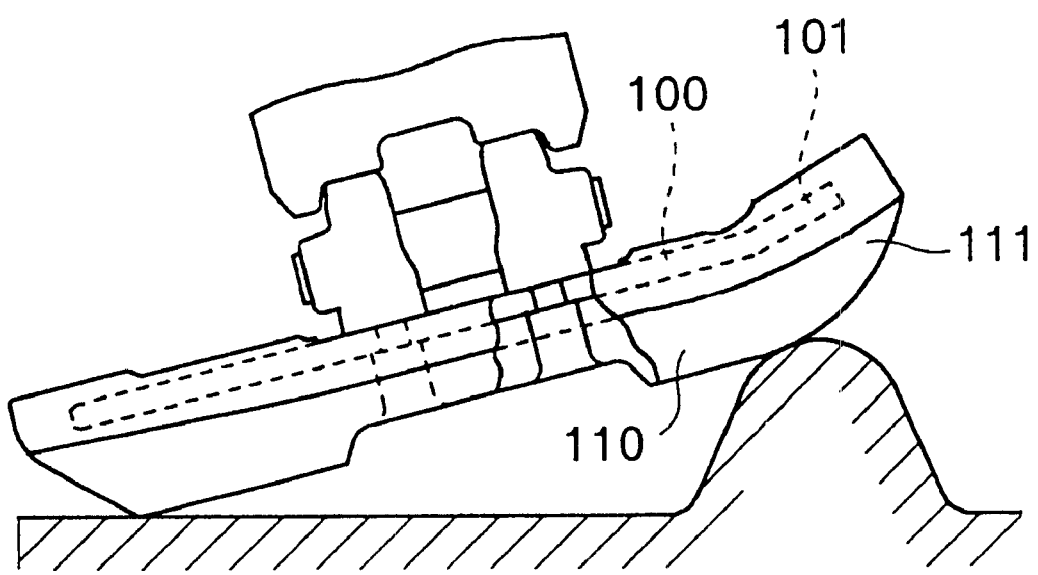
FIG. 42 is a view explaining a traveling state of the elastic flat tread in FIG. 40.

A tenth embodiment of the elastic flat tread will be explained with reference to FIG. 40, FIG. 41, and FIG. 42.

In an elastic flat tread 3K, a core 100 is covered with and bonded to an elastic solid 110 such as rubber. The core 100 is formed of spring steel. According to the structure, even if the elastic flat tread 3K runs on a protruding object during traveling, an end portion 101 in a longitudinal direction of the core 100 formed of spring steel is displaced upward, and thus local concentration of stress in an elastic solid end portion 111 can be avoided. Though the end portion 101 of the core 100 shown in FIG. 40 is formed to be flat, if the end portion 101 of the core 100 is bent toward the side not in contact with the ground as in the first embodiment in FIG. 1, local concentration of stress in the elastic solid end portion 111 can be further avoided. As a result, even if the elastic flat tread 3K runs on a protruding object during traveling, a crack does not occur in the elastic solid end portion 111, thus increasing durability of the elastic flat tread 3K.

An eleventh embodiment of the elastic flat tread will be explained with reference to FIG. 43 and FIG. 44.

An elastic flat tread 3L is formed by a core 115 covered with and bonded to an elastic solid 116. End portions 115a and 115b of the core 115 are bent toward the side not in contact with the ground. Accordingly, the basic structure of the eleventh embodiment is the same as that in FIG. 1 of the first embodiment. What makes the structure of the eleventh embodiment different from the first embodiment is a point in which a metal plate 9A is attached (fixed) to a link 8 by welding or the like to be integrated therewith, and the metal plate 9A is attached to the core 115 with bolts 9.

According to the above structure, the end portions 115a and 115b of the core 115 are bent to the side not in contact with the ground, and thus local concentration of stress in the elastic solid end portions 116a and 116b can be avoided as in the first embodiment in FIG. 1. As a result, even if the elastic flat tread 3L runs on a protruding object during traveling, a crack does not occur in the elastic solid end portions 116a and 116b, thus increasing durability of the elastic flat tread 3L. Further, the core 115 is attached to the link 8 with the metal plate 9A therebetween, thus making it unnecessary to provide bolt insertion holes in the elastic solid 116. As a result, problems such as a crack and peeling off resulting from the bolt insertion holes are eliminated.

Figure 45:
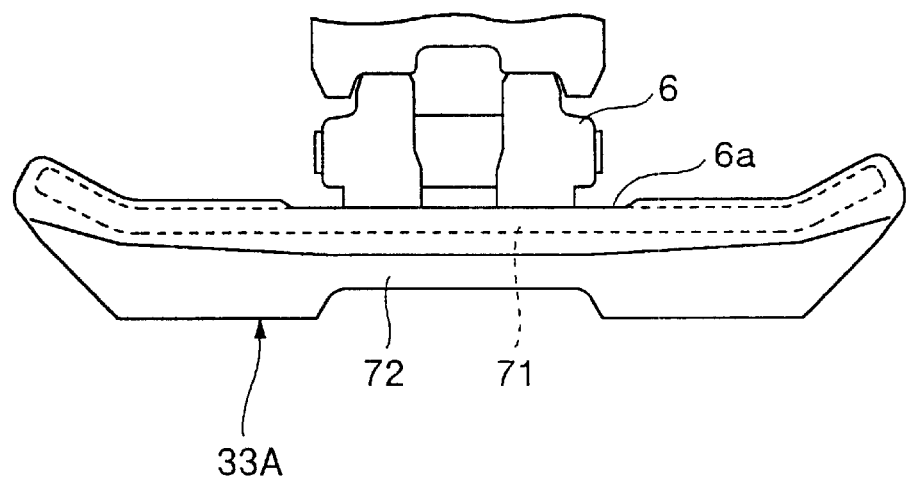
FIG. 45 is an explanatory view of an application of the eleventh embodiment of the elastic flat tread according to the present invention.

As an application relating to the integration of the eleventh embodiment, the link and the core may be integrated. For example, FIG. 45 shows integrated structure of the link 6 and the core 1 of the elastic flat tread 3A in FIG. 4. In an elastic flat tread 33A, the link 6 is attached to a core 71 on the link mounting surface 6a by welding. As a result, the formation of the bolt insertion holes 2c provided in the core 1 and the elastic solid 2 in FIG. 4 is eliminated and the bolts are made unnecessary.

Figure 43:
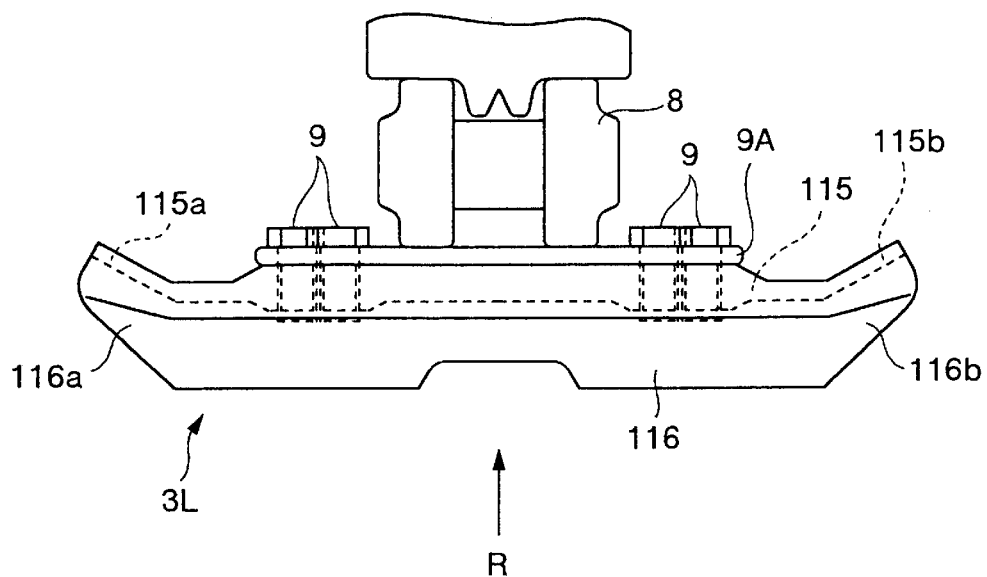
FIG. 43 is an explanatory view of an eleventh embodiment of the elastic flat tread according to the present invention.
Figure 44:
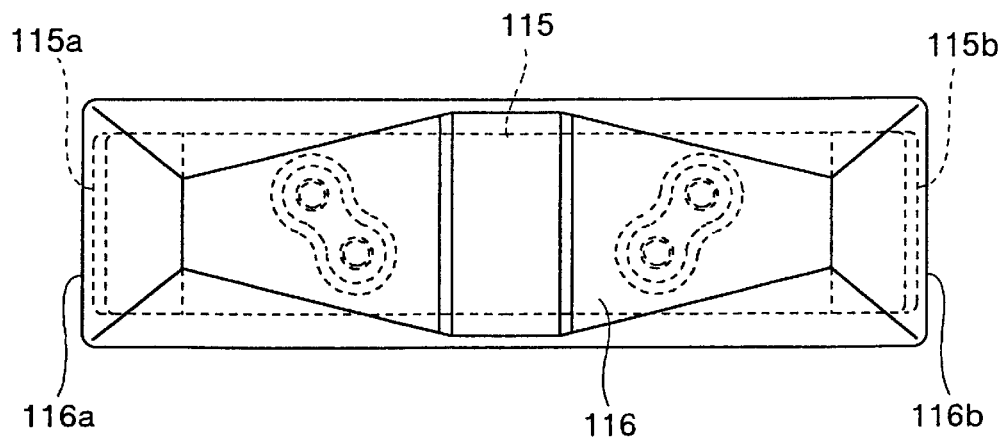
FIG. 44 is a view seen from the arrow R in FIG. 43.
Figure 46:
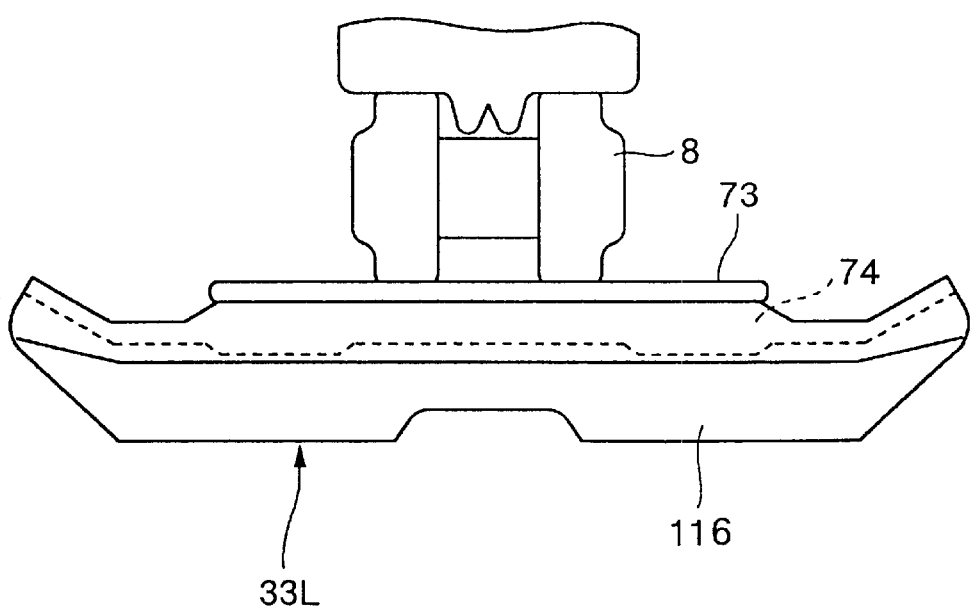
FIG. 46 is an explanatory view of another application of the eleventh embodiment of the elastic flat tread according to the present invention.

As another example of the integration, it may be suitable to integrate the link 8, the metal plate 9A and the core 115 in FIG. 43. For example, in an elastic flat tread 33L in FIG. 46, the link 8, a metal plate 73, and a core 74 are attached to one another by welding to be integrated. As a result, the bolt insertion holes provided in the core 115 and the metal plate 9A in FIG. 43 are eliminated, and the bolts 9 are made unnecessary.

Further, still another application of the eleventh embodiment will be listed.

Figure 34:
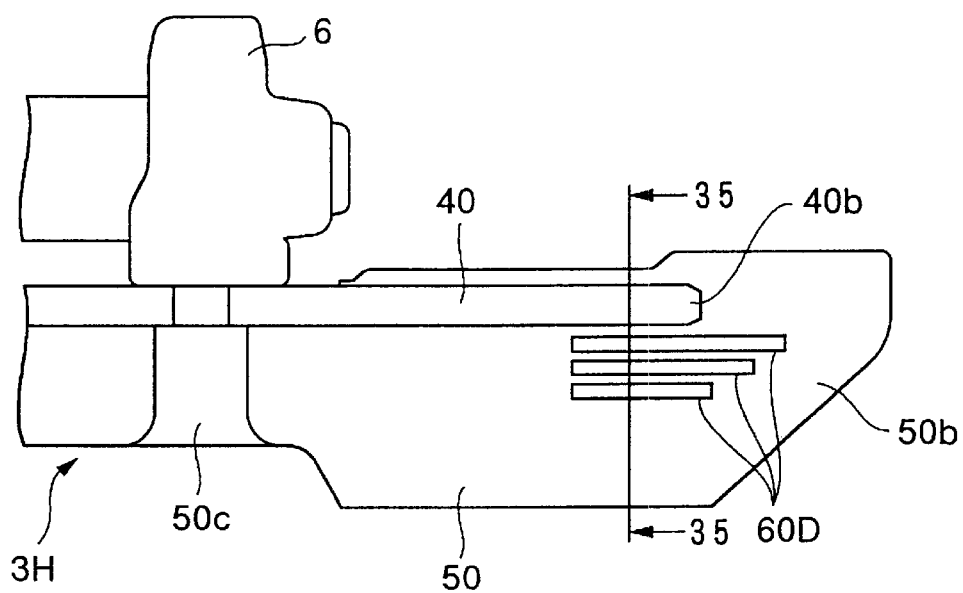
FIG. 34 is an explanatory view of a seventh embodiment of the elastic flat tread according to the present invention.
Figure 35:
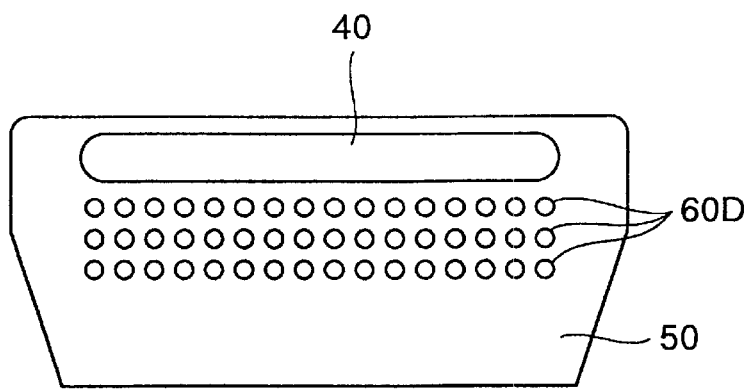
FIG. 35 is a sectional view taken along the 35—35 line in FIG. 34.

(1) Any one of the cable layers 60A in FIG. 28, 60B in FIG. 29, 60C in FIG. 33, and 60D in FIG. 34 is placed inside the elastic solid 116 under the core 115 and near the core end portion 115b.

(2) The elastic solid 116 is integrally formed by the elastic solids 80X, 80Y, and 80Z (See FIG. 37) with different hardnesses so that the elastic solid 116 has the same structure as the elastic solid 80 in FIG. 37, and the hardness is the highest at the portion nearest to the core 115 and sequentially lowers toward the ground-contacting side.

(3) The elastic solid 116 includes the synthetic resin member 95 fixed to the elastic solid 116 near the end portion 115b in a longitudinal direction of the core 115 (almost corresponds to the elastic solid end portion 116b) so as to have the same structure as the elastic solid 90 and the synthetic resin member 95 in FIG. 39. (4) The core 115 is formed of spring steel. (5) Further, the core 115 in the above items (1) to (4) is formed to be flat, specifically, to be in a form in which the core end portions 115a and 115b are not bent.

Figure 47:
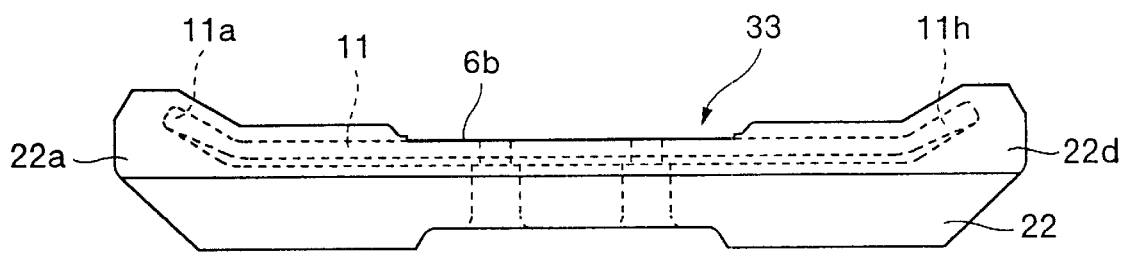
FIG. 47 is an explanatory view of a twelfth embodiment of the elastic flat tread according to the present invention.
Figure 48:
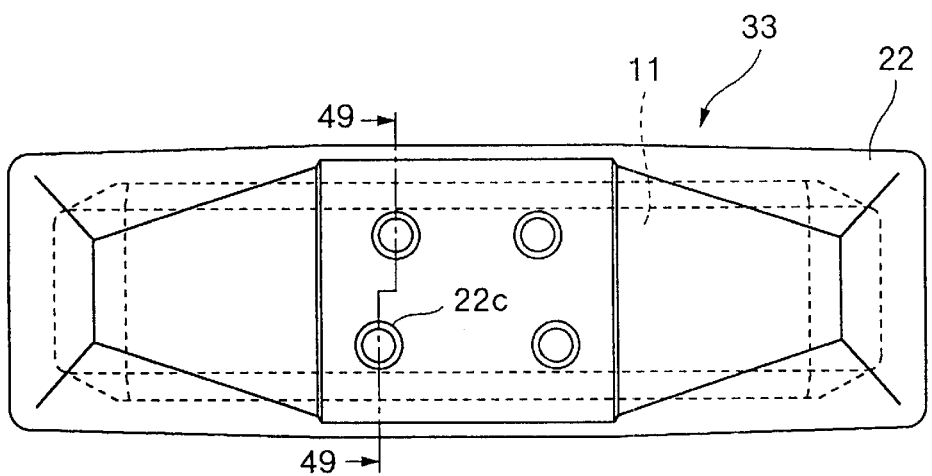
FIG. 48 is an explanatory view of the elastic flat tread in FIG. 47 seen from the ground-contacting side.
Figure 49:
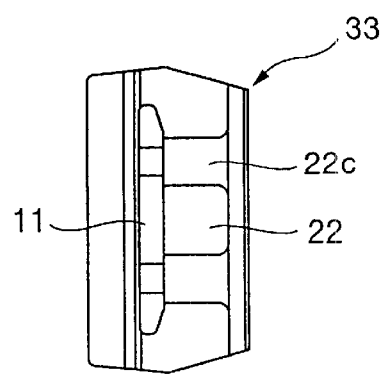
FIG. 49 is a sectional view taken along the 49—49 line in FIG. 48.

A twelfth embodiment of the elastic flat tread will be explained with reference to FIG. 47 through FIG. 49. The elastic flat tread 33 is substantially the same as the elastic flat tread 33 in FIG. 17 and FIG. 18, and the core 11 other than the link mounting surface 6b is covered with and bonded to the elastic solid 22 such as rubber. The end portions 11a and 11h in the longitudinal direction of the core 11 are bent toward the side not in contact with the ground. According to the structure, as in the above embodiments, even if the elastic flat tread 33 runs on a protruding object during traveling, a crack does not occur in the elastic solid end portions 22a and 22d, thus increasing durability of the elastic flat tread 33.

Figure 50:
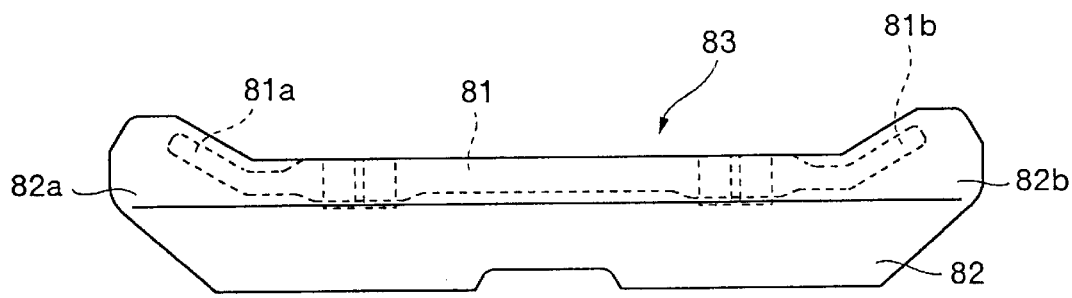
FIG. 50 is an explanatory view of a thirteenth embodiment of the elastic flat tread according to the present invention.
Figure 51:
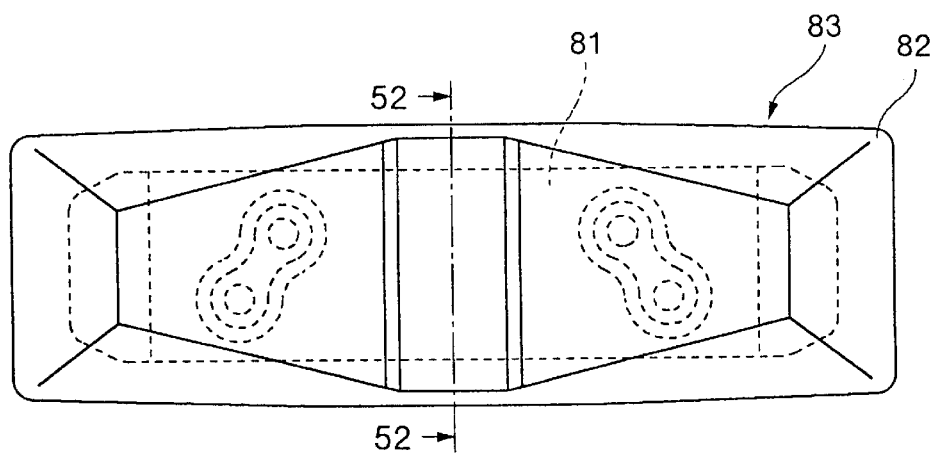
FIG. 51 is an explanatory view of the elastic flat tread in FIG. 50 seen from the ground-contacting side.

A thirteenth embodiment of the elastic flat tread will be explained with reference to FIG. 50 through FIG. 52. In an elastic flat tread 83, a core 81 is covered with and bonded to an elastic solid 82 such as rubber. End portions 81a and 81b in a longitudinal direction of the core 81 are bent toward the side not in contact with the ground. According to the structure, as in the above embodiments, even if the elastic flat tread 83 runs on a protruding object during traveling, a crack does not occur in elastic solid end portions 82a and 82b, thus increasing durability of the elastic flat tread 83.

It goes without saying that the elastic flat treads according to the present invention described in detail thus far can be applied to construction equipment small to large in size as well as to endless crawler belts of industrial equipment, agricultural machinery and the like other than the construction equipment.

Industrial Availability

The present invention is useful as an elastic flat tread which can prevent a crack from occurring in an elastic solid when the elastic flat tread runs on or collides with an protruding object such as a rock and stone, and a curb stone of a sidewalk during traveling.

What is claimed is:

1. An elastic flat tread for a crawler having a traveling direction; the tread comprising:

links arrayed in the traveling direction of the crawler and comprising link end portions;

pins coupling the link end portions of adjacent links; and cores attached to respective ones of the links and covered with an elastic solid at least on a ground-facing side thereof;

said cores comprising end portions that are bent, in a longitudinal direction, away from the ground-facing side thereof; and wherein at least one of said cores on a side opposite the ground is covered with an elastic solid including an outer surface of the elastic solid which extends along the opposite side parallel to said bent core end portions.

2. The elastic flat tread in accordance with claim 1, wherein at least one layer of cable layers is provided inside said elastic solid, from a portion under the end portion in a longitudinal direction of said any core through a portion outside the end portion in the longitudinal direction of said any core.

3. The elastic flat tread in accordance with claim 2, wherein a direction in which cable wires of said cable layers are placed is the parallel direction, or the combination of two directions or the parallel and diagonal directions, relative to the longitudinal direction of said any core.

4. The elastic flat tread in accordance with claim 1, wherein said elastic solid is integrally formed by elastic solids with different hardnesses, in which the hardness at a portion in contact with said any core is the highest and the hardness sequentially lowers toward the ground-contacting side.

5. The tread according to claim 1, wherein the core is attached to the link by a metal plate which is attached to the link.

6. An elastic flat tread for a crawler having a traveling direction; the tread comprising:

links arrayed in the traveling direction of the crawler and comprising link end portions;

pins coupling the link end portions of adjacent links; and cores attached to respective ones of the links and covered with an elastic solid at least on a ground-facing side thereof;

said cores comprising end portions that are bent, in a longitudinal direction, away from the ground-facing side thereof; and wherein the ratio between a height h, which is from a mounting surface for said link up to a tip end in a height direction of the end portion in the longitudinal direction of at least one of said cores, and a link pitch Lp is $0.05 \leq h/Lp \leq 0.25$.

7. The tread according to claim 6, wherein the core is attached to the link by a metal plate which is attached to the link.

8. An elastic flat tread for a crawler having a traveling direction; the tread comprising:

links arrayed in the traveling direction of the crawler and comprising link end portions;

pins coupling the link end portions of adjacent links; and cores attached to respective ones of the links and covered with an elastic solid at least on a ground-facing side thereof;

said cores comprising end portions that are bent, in a longitudinal direction, away from the ground-facing side thereof, and wherein the ratio between a height h, which is from a mounting surface for said link up to a tip end in a height direction of the end portion in the longitudinal direction of at least one of said cores, and a height H of the elastic flat tread is $0.08 \leq h/H \leq 0.50$.

9. The tread according to claim 8, wherein the core is attached to the link by a metal plate which is attached to the link.

10. An elastic flat tread for a crawler having a traveling direction; the tread comprising:

links arrayed in the traveling direction of the crawler and comprising link end portions;

pins coupling the link end portions of adjacent links; and cores attached to respective ones of the links and covered with an elastic solid at least on a ground-facing side thereof, said cores comprising end portions that are bent, in a longitudinal direction, away from the ground-facing side thereof, and wherein the ratio between a width W1 of at least one of said cores and a width W2 of a tip end in the longitudinal direction of the one of said cores is $0.5 \leq W2/W1 \leq 0.9$.

11. The tread according to claim 10, wherein the core is attached to the link by a metal plate which is attached to the link.

12. An elastic flat tread for a crawler having a traveling direction; the tread comprising:

links arrayed in the traveling direction of the crawler and comprising link end portions;

pins coupling the link end portions of adjacent links; and cores attached to respective ones of the links and covered with an elastic solid at least on a ground-facing side thereof, said cores comprising end portions that are bent, in a longitudinal direction, away from the ground-facing side thereof; and wherein end portions of said elastic solid are protruded outward relative to the tip ends of the end portions in the longitudinal direction of said core; and wherein at least one of said cores, on a side opposite the ground, is covered with an elastic solid including an outer surface of the elastic solid which extends along the opposite side parallel to said bent core end portions.

* * * * *